US012639553B2

(12) United States Patent
Benkert et al.

(10) Patent No.: US 12,639,553 B2
(45) Date of Patent: May 26, 2026

(54) DATA MINING USING MACHINE LEARNING FOR AUTONOMOUS SYSTEMS AND APPLICATIONS

(71) Applicant: NVIDIA Corporation, Santa Clara, CA (US)

(72) Inventors: Ryan Marc Christian Benkert, Atlanta, GA (US); Shanshan Xu, Palo Alto, CA (US); Yifang Xu, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 713 days.

(21) Appl. No.: 18/156,017

(22) Filed: Jan. 18, 2023

(65) Prior Publication Data
US 2024/0249118 A1    Jul. 25, 2024

(51) Int. Cl.
*G06N 3/0464*        (2023.01)

(52) U.S. Cl.
CPC .................................. *G06N 3/0464* (2023.01)

(58) Field of Classification Search
CPC ......... G06N 3/045; G06N 3/0464; G06N 3/08
See application file for complete search history.

(56) References Cited

U.S. PATENT DOCUMENTS

| | | | | |
|---|---|---|---|---|
| 6,556,977 B1 * | 4/2003 | Lapointe | ................ | G16H 50/20 |
| | | | | 706/45 |
| 10,565,471 B1 * | 2/2020 | Abdi Taghi Abad | .... | G06N 7/01 |

| | | | | |
|---|---|---|---|---|
| 10,872,271 B2 * | 12/2020 | Zagaynov | ............ | G06N 3/0464 |
| 11,494,613 B2 * | 11/2022 | Vila Casado | ........ | G06N 3/0464 |
| 11,783,568 B2 * | 10/2023 | Mao | ..................... | G05D 1/0231 |
| | | | | 382/103 |
| 2015/0242747 A1 * | 8/2015 | Packes | ................... | G06Q 50/16 |
| | | | | 706/17 |
| 2019/0318099 A1 * | 10/2019 | Carvalho | .............. | G06F 21/577 |
| 2020/0250539 A1 * | 8/2020 | Liu | ...................... | G06N 3/0464 |

(Continued)

OTHER PUBLICATIONS

Di Feng et al. , "A Review and Comparative Study on Probabilistic Object Detection in Autonomous Driving, "Aug. 30, 2021, IEEE Transactions On Intelligent Transportation Systems, vol. 23, No. 8, Aug. 2022, pp. 9961-9975.*

(Continued)

*Primary Examiner* — Omar S Ismail

(74) *Attorney, Agent, or Firm* — IRON SUMMIT IP LLP

(57)        ABSTRACT

In various examples, machine learning data mining for autonomous or semi-autonomous systems and applications is described herein. Systems and methods are disclosed that use neural networks to perform one or more data mining processes. For instance, a first neural network(s) may process input data (e.g., image data) to remove data samples (e.g., images) that are associated with a first object classification(s) and/or a second neural network(s) may process the input data to retrieve data samples (e.g., images) that are associated with a second classification(s). Next, a third neural network(s) may process filtered input data (e.g., the input data not removed by the first neural network(s) and/or the input data retrieved by the second neural network(s)) to determine uncertainty classifications associated with the data samples and a fourth neural network(s) may process the filtered input data to determine final object classifications associated with the data samples.

20 Claims, 17 Drawing Sheets

(56) References Cited

U.S. PATENT DOCUMENTS

| | | | |
|---|---|---|---|
| 2021/0026355 A1* | 1/2021 | Chen | G06F 18/23 |
| 2021/0295171 A1* | 9/2021 | Kamenev | G06T 7/20 |
| 2022/0076000 A1* | 3/2022 | Yang | G06V 20/597 |
| 2022/0114449 A1* | 4/2022 | Wu | G06V 10/751 |
| 2022/0254006 A1* | 8/2022 | Jin | G06V 10/82 |
| 2024/0104369 A1* | 3/2024 | Verma | G06N 3/045 |

OTHER PUBLICATIONS

Muhammad Naseer Bajwa et al., "Confident Classification Using a Hybrid Between Deterministic and Probabilistic Convolutional Neural Networks," Jul. 2, 2020, IEEEAccess, vol. 8,2020,pp. 115476-115481.*

Ahmad Jalal et al., "Scene Semantic Recognition Based on Modified Fuzzy C-Mean and Maximum Entropy Using Object-to-Object Relations," Feb. 19, 2021, IEEEAccess, vol. 9,2021,pp. 27758-27765.*

Liang Peng et al.,"Uncertainty Evaluation of Object Detection Algorithms for Autonomous Vehicles,"Jul. 30, 2021, Automotive Innovation (2021) 4,pp. 241-250.*

Haiman Tian et al., "Automatic Convolutional Neural Network Selection for Image Classification Using Genetic Algorithms, "Aug. 6, 2018, 2018 IEEE International Conference on Information Reuse and Integration for Data Science, pp. 444-448.*

Jamie Roche et al., "A Multimodal Data Processing System for LiDAR-Based Human Activity Recognition," Jun. 24, 2021, IEEE Transactions On Cybernetics, vol. 52, No. 10, Oct. 2022,pp. 10027-10037.*

* cited by examiner

ANOMALY COMPONENT
116B

FIGURE 7

FIGURE 8

900

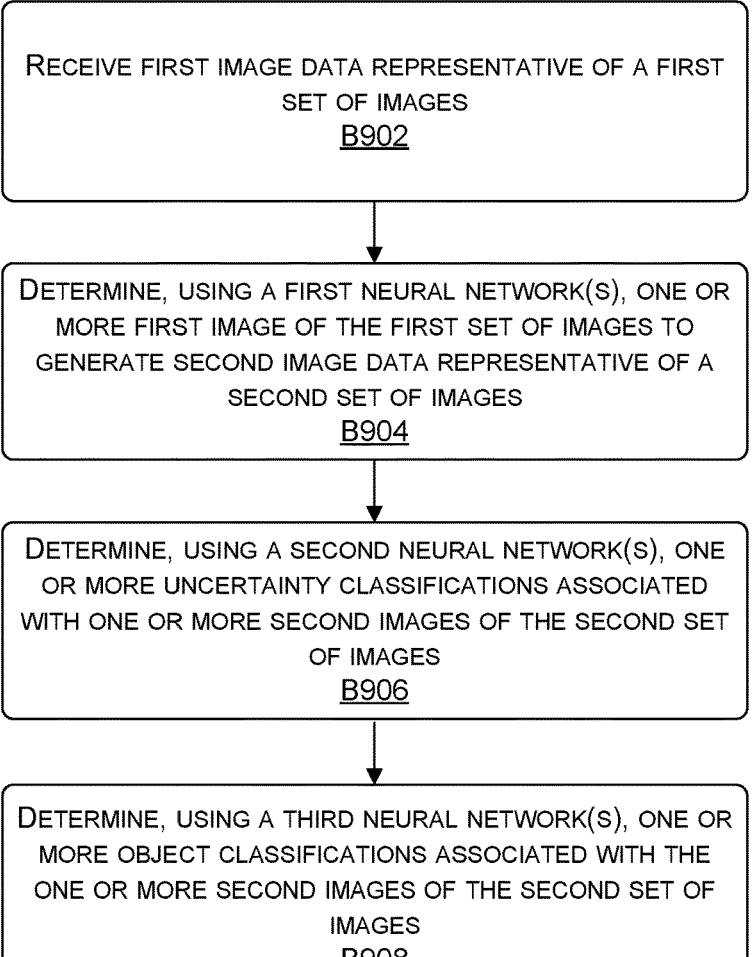

RECEIVE FIRST IMAGE DATA REPRESENTATIVE OF A FIRST
SET OF IMAGES
B902

DETERMINE, USING A FIRST NEURAL NETWORK(S), ONE OR
MORE FIRST IMAGE OF THE FIRST SET OF IMAGES TO
GENERATE SECOND IMAGE DATA REPRESENTATIVE OF A
SECOND SET OF IMAGES
B904

DETERMINE, USING A SECOND NEURAL NETWORK(S), ONE
OR MORE UNCERTAINTY CLASSIFICATIONS ASSOCIATED
WITH ONE OR MORE SECOND IMAGES OF THE SECOND SET
OF IMAGES
B906

DETERMINE, USING A THIRD NEURAL NETWORK(S), ONE OR
MORE OBJECT CLASSIFICATIONS ASSOCIATED WITH THE
ONE OR MORE SECOND IMAGES OF THE SECOND SET OF
IMAGES
B908

DETERMINE, USING A FIRST NEURAL NETWORK(S), ONE OR MORE PROBABILITIES ASSOCIATED WITH AN IMAGE
B1002

DETERMINE, BASED AT LEAST ON THE ONE OR MORE PROBABILITIES, AN UNCERTAINTY CLASSIFICATION ASSOCIATED WITH THE IMAGE
B1004

DETERMINE, USING A SECOND NEURAL NETWORK(S), AN OBJECT CLASSIFICATION ASSOCIATED WITH THE IMAGE
B1006

1200

1300

DATA MINING USING MACHINE LEARNING FOR AUTONOMOUS SYSTEMS AND APPLICATIONS

BACKGROUND

Data mining is important for many applications, such as to generate training data for neural networks, retrieve specific data samples for human analysis, and/or the like. Typically, systems that perform data mining use a human to review data samples in order to provide annotations describing content associated with the data samples. For example, such as when a system is performing data mining to generate training data for neural networks of autonomous and/or semi-autonomous vehicles that detect street signs, a human may review images captured by vehicles while the vehicles were navigating around environments. Based on the review, the human may determine sign classifications (e.g., stop signs, speed limit signs, crosswalk signs, etc.) associated with the signs depicted by the images and provide annotations for the images that identify locations of the signs (e.g., using bounding shapes) and that describe the sign classifications (e.g., stop sign, yield sign, construction sign, etc.). These images, along with the annotations, may then be used as the training data for the neural networks.

Since data mining includes humans reviewing data samples in order to provide the annotations, many data mining processes take long periods of time to complete. For instance, and using the example above, in order to generate adequate training data for the neural networks that are used to detect and classify signs, the training data may require thousands of images depicting different sign classifications, where each image needs to be annotated by a human. Additionally, in some circumstances, such as when a system is mining data associated with a specialized field (e.g., the financial field), the data mining may require a human that is also specialized in the field to annotate the data samples.

SUMMARY

Embodiments of the present disclosure relate to machine learning data mining for autonomous or semi-autonomous systems and applications. Systems and methods are disclosed that use neural networks to perform one or more data mining processes. For instance, an initial data mining process(es) may use a first neural network(s) to process input data (e.g., image data) to remove data samples (e.g., images) that are associated with a first object classification(s) and/or a second neural network(s) may process the input data to retrieve data samples (e.g., images) that are associated with a second classification(s). Next, a data mining process(es) may use a third neural network(s) to process filtered input data (e.g., the input data not removed by the first neural network(s) and/or the input data retrieved by the second neural network(s)) to determine uncertainty classifications associated with the data samples. Furthermore, a data mining process(es) may use a fourth neural network(s) to process the filtered input data to determine final object classifications associated with the data samples.

In contrast to conventional systems, such as those described above, the current systems, in some embodiments, may automatically generate annotations for at least a portion of the data samples without human interaction. In such embodiments, the current systems are able to automatically generate the annotations based on the uncertainty classifications that the systems associate with the data samples, where the uncertainty classifications verify that the annotations for the data samples are correct and, as such, do not need human intervention. Additionally, in contrast to the conventional systems, the current systems, in some embodiments, are able to quickly filter the data in order to remove data samples that are not important (e.g., included in an object classification that is not important) and/or identify data samples that are of high importance (e.g., included in a data classification that is of high importance).

BRIEF DESCRIPTION OF THE DRAWINGS

The present systems and methods for machine learning-based data mining for autonomous or semi-autonomous systems and applications are described in detail below with reference to the attached drawing figures, wherein:

FIG. 7 illustrates an example of determining uncertainty classifications associated with images, in accordance with some embodiments of the present disclosure;

FIG. 8 illustrates an example data flow diagram for a process of automatically labeling images, in accordance with some embodiments of the present disclosure;

FIG. 9 is a flow diagram showing a method for performing data mining using neural networks in order to label images, in accordance with some embodiments of the present disclosure;

DETAILED DESCRIPTION

Figure 1:
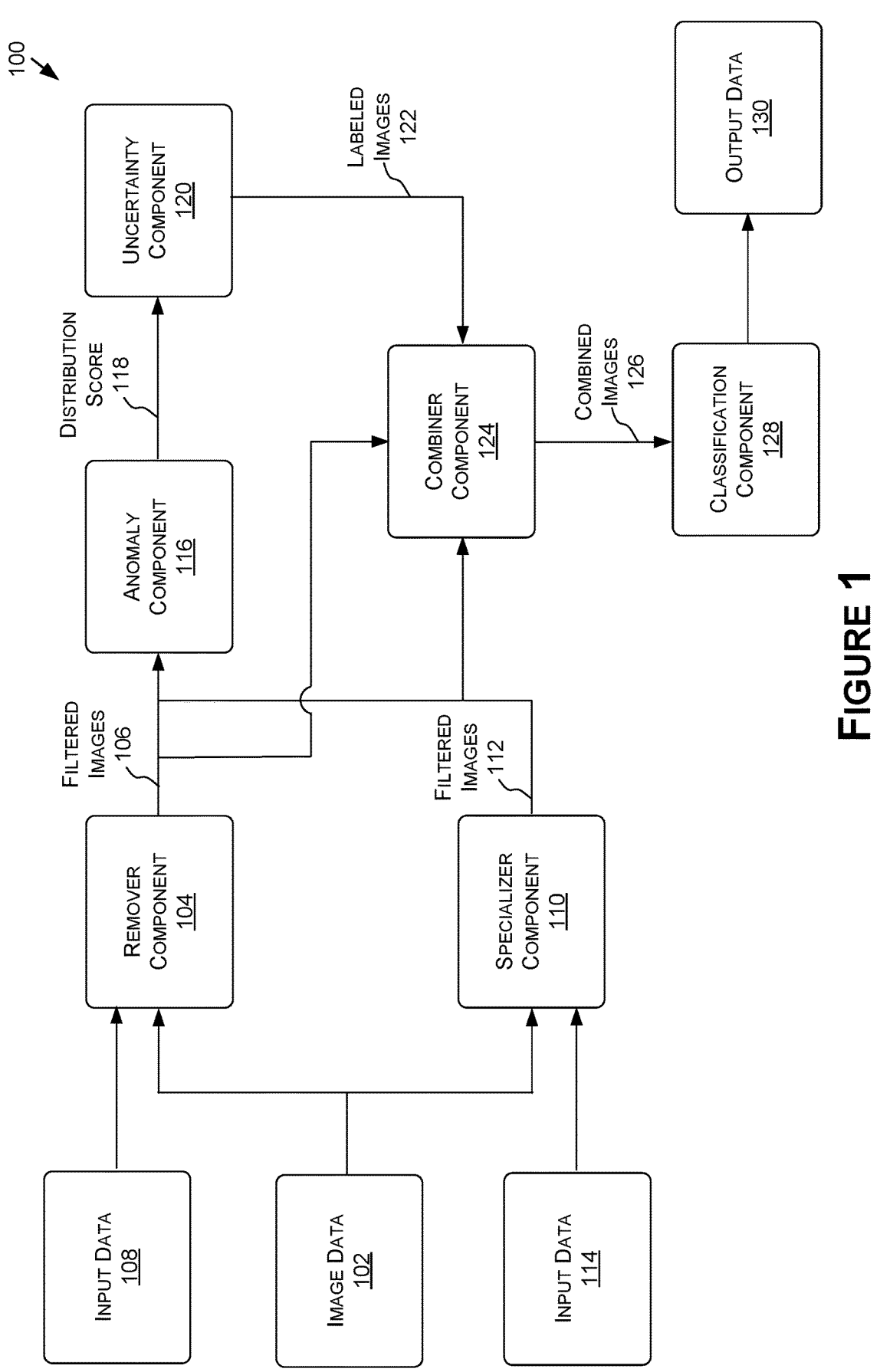
FIG. 1 illustrates an example data flow diagram for a process of performing data mining using one or more neural networks, in accordance with some embodiments of the present disclosure.

Systems and methods are disclosed related to machine learning-based data mining for autonomous or semi-autonomous systems and applications. Although the present disclosure may be described with respect to an example autonomous or semi-autonomous vehicle 1100 (alternatively referred to herein as "vehicle 1100" or "ego-machine 1100," an example of which is described with respect to FIGS. 11A-11D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to data mining with respect to autonomous or semi-autonomous machine applications, this is not intended to be limiting, and the systems and methods described herein may be used in augmented reality, virtual reality, mixed reality, robotics, security and surveillance, autonomous or semi-autonomous machine applications, and/or any other technology spaces where data mining may be used.

For instance, a system(s) may receive data, such as image data, representative of images (also referred to as a "first set of images") depicting objects. In some examples, the image data is generated using one or more sensors of one or more vehicles while navigating around or through one or more environments. In such examples, the objects may include, but are not limited to, other vehicles, street signs, pedestrians, road markings, structures, animate actors, static objects, and/or any other type of object located within the one or more environments. The system(s) may then process the image data using one or more neural networks associated with the data mining in order to generate annotations associated with the objects depicted in the images. While the examples described herein include performing data mining on image data, in other examples, similar processes may be used to perform data mining on other types of data, such as LiDAR data, RADAR data, ultrasonic data, text data, audio data, video data, and/or any other type of data. As such, reference to image data or sensor data herein, may refer to or may alternatively refer to data generated using any type of sensor and/or data of any modality and/or of any format.

The system(s) may perform one or more initial data mining processes to filter out at least a portion of the images represented by the image data. For a first example, the system(s) may process the image data using a first neural network(s) that is trained to remove one or more images from the first set of images that are associated with one or more object classifications (also referred to, in some examples, as the "first object classification(s)"), such that the first object classification(s) is not important (at least to the task at hand). In some examples, a user is able to set the first object classification(s) and/or a threshold probability that is used to remove the one or more images associated with the first object classification(s). For a second example, the system(s) may process the image data using a second neural network(s) that is trained to retrieve one or more images from the first set of images that are associated with one or more object classifications (also referred to, in some examples, as the "second object classification(s)"), such that the second object classification(s) is important (at least to the task at hand). In some examples, the user is able to set the second object classification(s) and/or a threshold probability that is used to retrieve the one or more images associated with the second object classification(s).

The system(s) may then generate a second set of images that includes one or more images from the first set of images that were not removed by the first neural network(s) and/or the one or more images that were retrieved by the second neural network(s). As such, by performing these initial data mining processes, the second set of images may (1) not include the first object classification(s) that is of no or little importance and (2) include the second object classification(s) that is of some and/or high importance. The system(s) may then perform one or more additional data mining processes on image data representative of the second set of images.

For example, the system(s) may process the image data using a third neural network(s) that is trained to determine uncertainty classifications associated with the images from the second set of images. As described herein, the uncertainty classifications may include a first uncertainty classification associated with images that should receive an additional review, such as from one or more users, since the objects depicted by the images may be difficult to identify using machine learning. The uncertainty classifications may also include a second uncertainty classification associated with images that do not need to receive an additional review, such as from the one or more users, since the objects depicted by the images may be easy to identify using machine learning. While these are just two examples of uncertainty classifications that the third neural network(s) may be trained to identify, in other examples, the third neural network(s) may be trained to identify additional and/or alternative uncertainty classifications.

As described in more detail herein, the system(s) may determine an uncertainty classification associated with an image by initially determining one or more probabilities associated with the image using the third neural network(s). In some examples, the system(s) determines multiple probabilities by applying the same image to a neural network numerous times (e.g., two times, five times, ten times, one hundred times, etc.). In such examples, each time the system(s) applies the image to the neural network, the system(s) may switch out different neurons of the neural network such that the neural network provides different probabilities. In other examples, the system(s) determines multiple probabilities by applying the same image to different neural networks. In either of the examples, the system(s) may then determine a distribution and/or an uncertainty score associated with the probabilities and use the distribution and/or the uncertainty score to determine the uncertainty classification associated with the image.

The system(s) may also process the image data using a fourth neural network(s) that is trained to determine object classifications associated with the images (e.g., final object classifications for labeling the images). In some examples, the object classifications may be general, such as vehicle, street sign, pedestrian, road marking, structure, and/or the like. In some examples, the object classifications may be more specific. For example, if the fourth neural network(s) is trained to determine object classifications associated with street signs, then the object classifications may include stop sign, speed limit sign, 55 MPH speed limit sign, 65 MPS speed limit sign, crosswalk sign, and/or the like. In some examples, the fourth neural network(s) is trained to output a single object classification for an image, such as speed limit sign. In some examples, the fourth neural network(s) is trained to output multiple object classifications for an image, such as speed limit sign and 55 MPH speed limit sign.

The system(s) may then be configured to output data based on the processing of the image data. As described herein, the data associated with an image may represent the image (or a cropped image that depicts the object), the uncertainty classification, the object classification, and/or any other information. The user(s) associated with the system(s) may then use the data to perform one or more tasks. For a first example, the user(s) may review the images that are associated with the first uncertainty classifications to determine whether the object classifications associated with the images are correct. For a second example, the user(s) may provide the data to one or more other system(s) for further processing, such as to train one or more additional neural networks.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, data mining, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing data mining, systems for performing light transport simulation, systems for performing collaborative content creation for 3D assets, systems implemented at least partially using cloud computing resources, and/or other types of systems.

With reference to FIG. 1, FIG. 1 illustrates an example data flow diagram for a process of performing data mining using one or more neural networks, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1100 of FIGS. 11A-11D, example computing device 1200 of FIG. 12, and/or example data center 1300 of FIG. 13.

The process 100 may include receiving image data 102 representative of images (e.g., a first set of images) depicting objects. In some examples, the images may include cropped images depicting the objects and/or the images may include bounding shapes indicating the locations of the objects within the images. For example, another system and/or component, which is described with respect to FIG. 8, may have performed one or more initial processes on the images in order to generate the cropped images and/or in order to generate the bounding shapes indicating the locations of the objects within the images. In some examples, the images are associated with a broad object classification, such as vehicles, street signs, pedestrians, road markings, structures, and/or any other object classification. In some examples, the images may be associated with more than one broad object classification.

The process 100 may include a remover component 104 that is configured to process the image data 102 in order to generate additional image data representing filtered images 106. For instance, the remover component 104 may be configured to remove one or more of the images that are associated with one or more object classifications. For a first example, if the image data 102 represents images that depict street signs (e.g., a broad object classification), then the remover component 104 may be configured to remove images that depict the backs of street signs (e.g., a first object classification) and/or images that only depict parts (e.g., less than a threshold amount of) of street signs (e.g., a second object classification). For a second example, if the image data 102 represents images that depict vehicles (e.g., a broad object classification), then the remover component 104 may be configured to remove images that depict a specific type of vehicle, such as motorcycles (e.g., an object classification). While these are just a couple examples of object classifications that the remover component 104 may be trained to remove, in other examples, the remover component 104 may be trained to remove any other type of object classification.

Figures 2A, 2B:
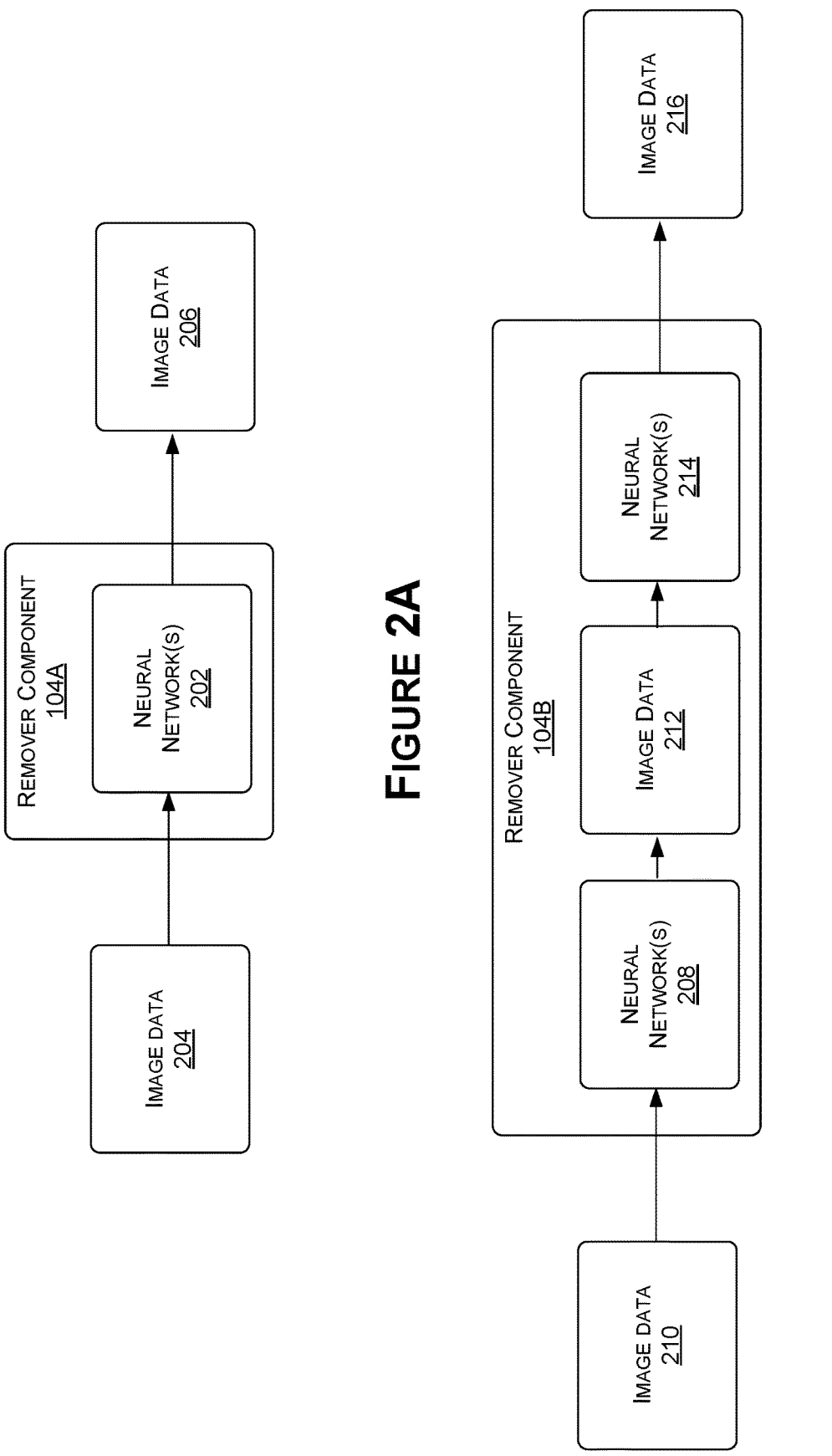
FIG. 2A illustrates an example of using a neural network(s) that is trained to remove images that are associated with an object classification, in accordance with some embodiments of the present disclosure.
FIG. 2B illustrates an example of using multiple neural networks that are trained to remove images that are associated with different object classifications, in accordance with some embodiments of the present disclosure.

In some examples, the remover component 104 may include one or more neural networks that are trained to generate an output(s) that indicates an image(s) should be removed. For instance, FIG. 2A illustrates an example of using a neural network(s) to remove images that are associated with an object classification(s), in accordance with some embodiments of the present disclosure. As shown, a remover component 104A may include a neural network(s) 202 that is trained to process image data 204 (which may represent, and/or include, the image data 102) in order to generate image data 206 representing filtered images (which may represent, and/or include, the filtered images 106). In the example of FIG. 2A, the neural network(s) 202 may be trained to aid in the removal of images that depict a specific object classification(s). For instance, and using the example above, if the image data 204 represents images that depict street signs, then the neural network(s) 202 may indicate that one or more of the images that depict the backs of street signs should be removed, where the backs of the street signs include an object classification.

FIG. 2B illustrates an example of using multiple neural networks that are trained to remove images that are associated with different object classifications, in accordance with some embodiments of the present disclosure. As shown, a remover component 104B now includes a first neural network(s) 208 that is trained to process image data 210 (which may represent, and/or include, the image data 102) in order to generate image data 212 representing first filtered images and a second neural network(s) 214 that is trained to process the image data 212 in order to generate image data 216 representing second filtered images (which may represent, and/or include, the filtered images 106). In the example of FIG. 2B, the first neural network(s) 208 may be trained to remove images that depict a first object classification and the second neural network(s) 214 may be trained to remove images that depict a second object classification. For instance, and using the example above, if the image data 210 again represents images that depict street signs, then the first neural network(s) 208 may be trained to generate an indication that images that depict the backs of street signs should be removed and the second neural network(s) 214 may be trained generate an indication that images that depict parts of street signs should be removed, where the backs of the street signs include a first object classification and the parts of street signs include a second object classification.

Referring back to the example of FIG. 1, in some examples, the remover component 104 may use one or more probability thresholds when removing images from the first set of images represented by the image data 102. For instance, when processing an image, a neural network(s) (e.g., the neural network(s) 202, the neural network(s) 208, and/or the neural network(s) 214) may generate one or more probabilities (e.g., one or more confidence scores) associated with one or more object classifications that the neural network(s) is trained to identify. For example, and again if the image data 102 represents images that depict street signs, the neural network(s) may be trained to identify a first type of street sign (e.g., a speed limit sign), a second type of street sign (e.g., a stop sign), a third type of street sign (e.g., a crosswalk sign), and/or so forth. As such, when processing an image, the neural network(s) may determine a first probability that the street sign depicted by the image includes the first type of street sign, a second probability that the street sign depicted by the image includes the second type of street sign, a third probability that the street sign depicted by the image includes the third type of street sign, and/or so forth.

As such, the neural network(s) may then use a probability threshold to determine whether to remove the image. For instance, and using the example above, if the neural network(s) is trained to remove the first type of street sign, then the neural network(s) may compare the first probability to the probability threshold in order to determine whether the first probability satisfies (e.g., is equal to or greater than) the probability threshold. If the neural network(s) determines that the first probability satisfies the probability threshold, then the neural network(s) may determine (e.g., compute an output indicating) that the image should be removed. However, if the first probability does not satisfy (e.g., is less than) the probability threshold, then the neural network(s) may determine (e.g., compute an output indicating) not to remove the image. In such an example, the neural network(s) may use the first probability associated with the important object classification, which is the first type of street sign, to determine whether to remove the image without considering the probabilities associated with the other object classifications, which are the second type of street sign, the third type of street sign, and/or so forth.

As such, the neural network(s) may remove a first number of images from the first set of images when using a first probability threshold and remove a second number of images from the first set of images when using a second, different probability threshold. For example, the greater the probability threshold used by the neural network(s), the lesser the number of images that the neural network(s) may remove from the first set of images. As such, a precision associated with the neural network(s) may be set.

Figure 3:
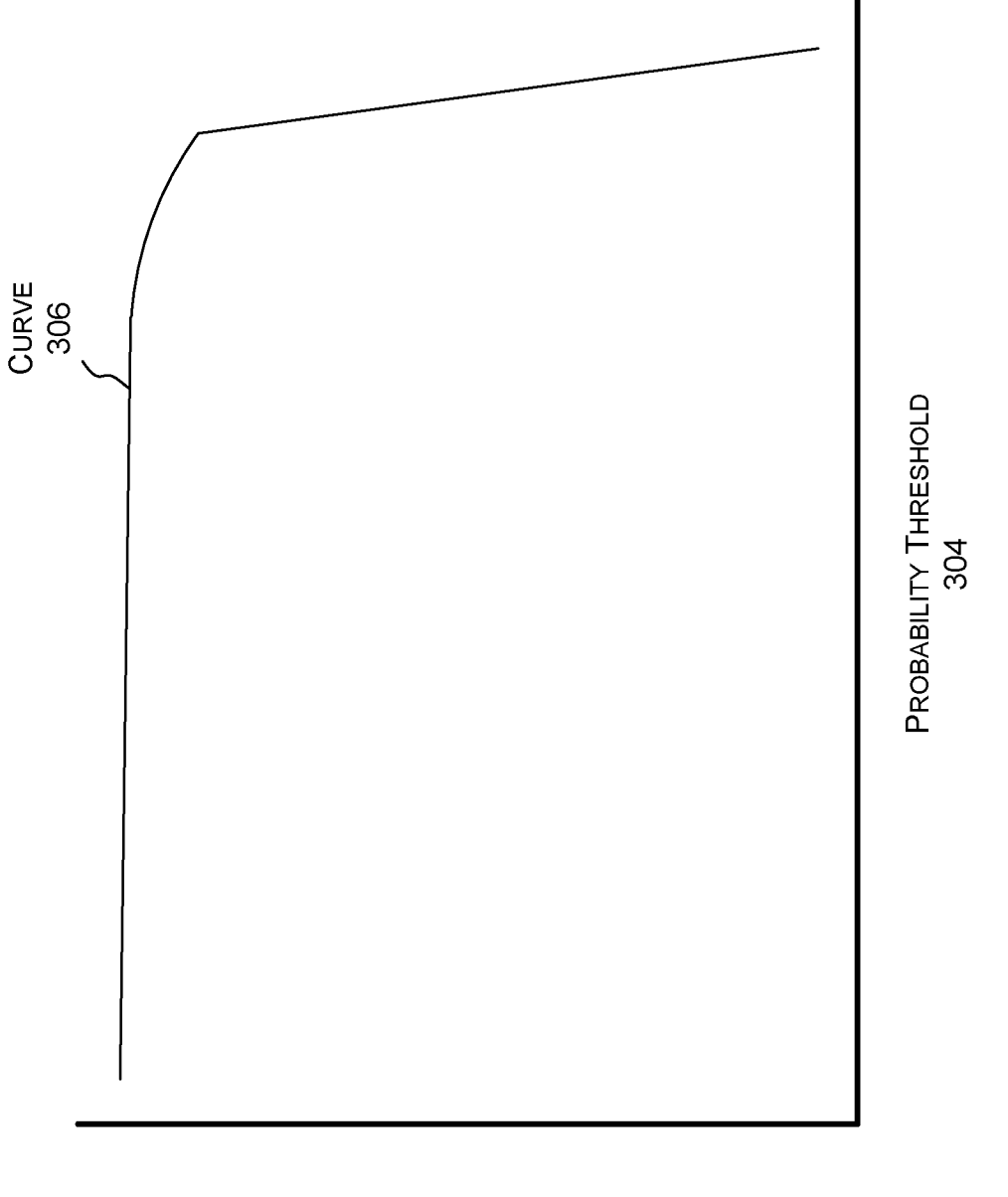
FIG. 3 illustrates an example of a relationship between a precision of a neural network(s) that is trained to removed images and a probability threshold used by the neural network(s), in accordance with some embodiments of the present disclosure.

For instance, FIG. 3 illustrates an example of a relationship between a precision 302 of a neural network(s) that is trained to aid in removing images and a probability threshold 304 used by the neural network(s), in accordance with some embodiments of the present disclosure. As shown, a curve 306 of the graph indicates that the precision 302 of the neural network(s) increases as the probability threshold 304 decreases since the neural network(s) will indicate removal of a greater percentage of the actual images that depict the object classification for which the neural network(s) is trained with respect to. However, the neural network(s) may also indicate removal of a greater number of images that depict another object classification(s) when the probability threshold 304 decreases. Additionally, the curve 306 of the graph indicates that the precision 302 of the neural network(s) decreases as the probability threshold 304 increases since the neural network(s) will indicate removal of a lesser percentage of the actual images that depict the object classification for which the neural network(s) is trained with respect to. However, the neural network(s) may also remove a lesser number of images that depict another object classification(s) when the probability threshold 304 increases.

Referring back to the example of FIG. 1, in some examples, one or more of the parameters of the remover component 104 may be configurable, such as by one or more users. For example, the user(s) may configure the one or more object classifications that the remover component 104 is configured to remove, the one or more threshold probabilities that the remover component 104 is configured to use when removing the images, a minimum number of images that the remover component 104 is configured to remove, a maximum number of images that the remover component 104 is configured to remove, a percentage of the images that the remover component 104 is configured to remove, and/or any other parameter. In some examples, the remover component 104 is updated based on receiving input data 108 representing the parameter(s) set of the user(s). However, in other examples, the remover component 104 may use a standard parameter(s).

The process 100 may include a specializer component 110 that is configured to process the image data 102 in order to generate additional image data representing filtered images 112. For instance, the specializer component 110 may be configured to retrieve one or more of the images that are associated with one or more object classifications. For a first example, if the image data 102 represents images that depict street signs, then the specializer component 110 may be configured to retrieve images that depict speed limit signs (e.g., a first object classification) and/or images that depict a specific type of speed limit sign, such 55 MPH street signs (e.g., a second object classification). For a second example, if the image data 102 represents images that depict vehicles, then the specializer component 110 may be configured to retrieve images that depict a specific type of vehicle, such as a bus (e.g., an object classification). While these are just a couple examples of object classifications that the specializer component 110 may be trained to retrieve, in other examples, the specializer component 110 may be trained to retrieve any other type of object classification.

Figures 4A, 4B:
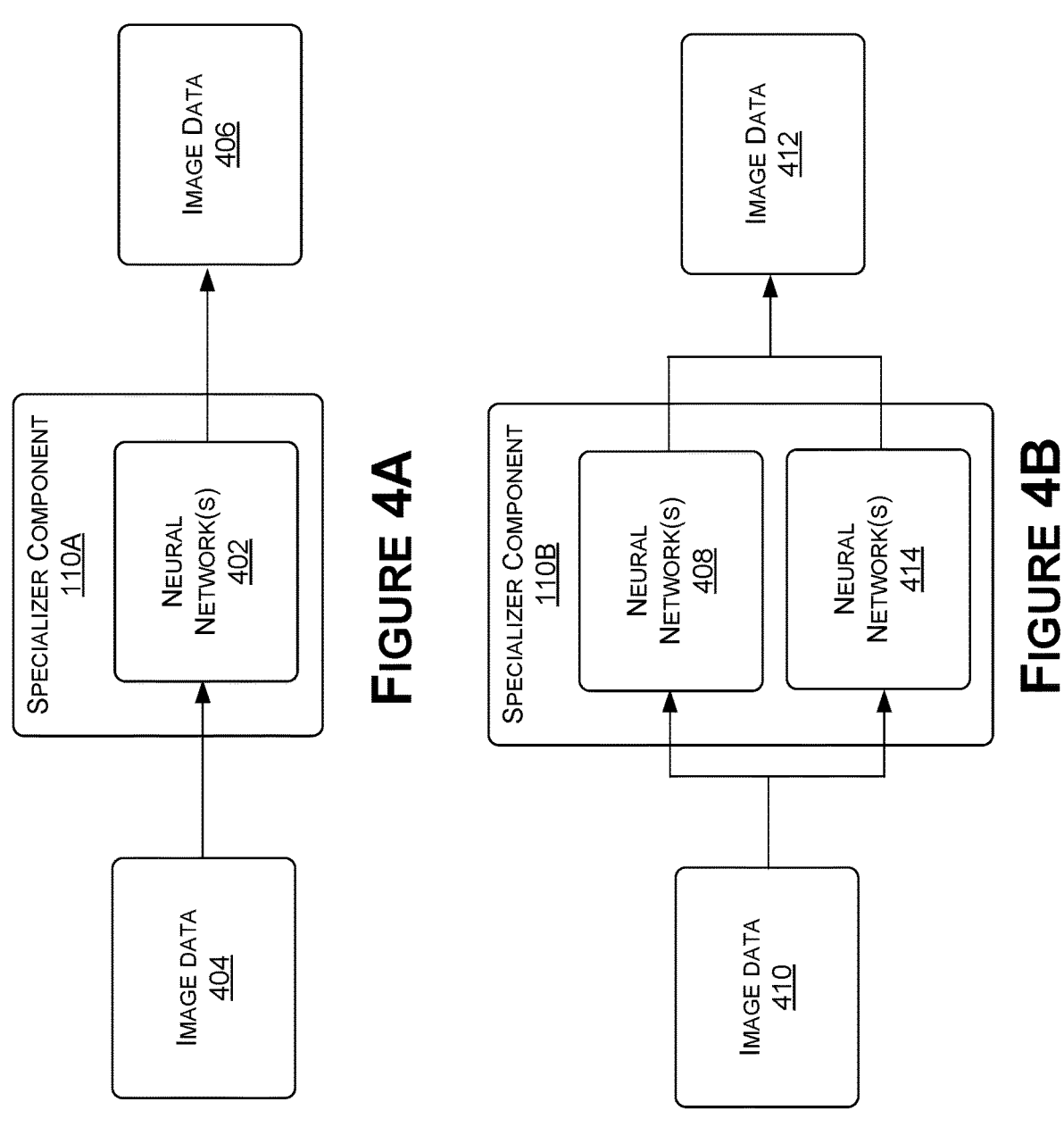
FIG. 4A illustrates an example of using a neural network(s) that is trained to retrieve images that are associated with an object classification, in accordance with some embodiments of the present disclosure.
FIG. 4B illustrates an example of using multiple neural networks that are trained to retrieve images that are associated with different object classifications, in accordance with some embodiments of the present disclosure.

In some examples, the specializer component 110 may include one or more neural networks that are trained to retrieve the images. For instance, FIG. 4A illustrates an example of using a neural network(s) that is trained to retrieve images that are associated with an object classification(s), in accordance with some embodiments of the present disclosure. As shown, a specializer component 110A may include a neural network(s) 402 that is trained to process image data 404 (which may represent, and/or include, the image data 102) in order to generate image data 406 representing filtered images (which may represent, and/or include, the filtered images 106). In the example of FIG. 4A, the neural network(s) 402 may be trained to retrieve images that depict a specific object classification(s). For instance, and using the example above, if the image data 404 represents images that depict street signs, then the neural network(s) 402 may be trained to retrieve one or more of the images that depict the speed limit signs, where the speed limit signs include an object classification.

FIG. 4B illustrates an example of using multiple neural networks that are trained to retrieve images that are associated with different object classifications, in accordance with some embodiments of the present disclosure. As shown, a specializer component 110B now includes a first neural network(s) 408 that is trained to process image data 410 (which may represent, and/or include, the image data 102) in order to generate a first portion of image data 412 representing first filtered images (which may represent, and/or include, a first portion of the filtered images 112) and a second neural network(s) 414 that is trained to process the image data 410 in order to generate a second portion of image data 412 representing second filtered images (which may represent, and/or include, a second portion of the filtered images 112). In the example of FIG. 4B, the first neural network(s) 408 may be trained to retrieve images that depict a first object classification and the second neural network(s) 414 may be trained to retrieve images that depict a second object classification. For instance, and using the example above, if the image data 410 again represents images that depict street signs, then the first neural network(s) 408 may be trained to retrieve images that depict speed limit signs and the second neural network(s) 414 may be trained to retrieve images that depict crosswalk signs, where the speed limit signs include a first object classification and the crosswalk signs include a second object classification.

Referring back to the example of FIG. 1, in some examples, the specializer component 110 may use one or more probability thresholds when retrieving images from the first set of images represented by the image data 102. For instance, when processing an image, a neural network(s) (e.g., the neural network(s) 402, the neural network(s) 408, and/or the neural network(s) 414) may generate one or more probabilities (e.g., one or more confidence scores) associated with one or more object classifications that the neural network(s) is trained to identify. For example, and again if the image data 102 represents images that depict street signs, the neural network(s) may be trained to identify a first type of street sign (e.g., a speed limit sign), a second type of street sign (e.g., a stop sign), a third type of street sign (e.g., a crosswalk sign), and/or so forth. As such, when processing an image, the neural network(s) may determine a first probability that the street sign depicted by the image includes the first type of street sign, a second probability that the street sign depicted by the image includes the second type of street sign, a third probability that the street sign depicted by the image includes the third type of street sign, and/or so forth.

As such, the neural network(s) or the system generally may then use a probability threshold to determine whether to retrieve the image. For instance, and using the example above, if the neural network(s) is trained to retrieve the second type of street sign, then the neural network(s) or the system generally may compare the second probability to the probability threshold to determine whether the second probability satisfies (e.g., is equal to or greater than) the probability threshold. If the neural network(s) or the system generally determines that the second probability satisfies the probability threshold, then the neural network(s) or the system generally may determine to retrieve the image. However, if the second probability does not satisfy (e.g., is less than) the probability threshold, then the neural network(s) or the system generally may determine not to retrieve the image. In such an example, the neural network(s) or the system generally may use the second probability associated with the important object classification, which is the second type of street sign, to determine whether to retrieve the image without considering the probabilities associated with the other object classifications, which are the first type of street sign, the third type of street sign, and/or so forth.

As such, the neural network(s) may be used to retrieve a first number of images from the first set of images when using a first probability threshold and to retrieve a second number of images from the first set of images when using a second, different probability threshold. For example, the greater the probability threshold used by the neural network(s) or the system generally, the lesser the number of images that the neural network(s) or the system generally may retrieve from the first set of images. As such, a precision associated with the neural network(s) may be set.

Figure 5:
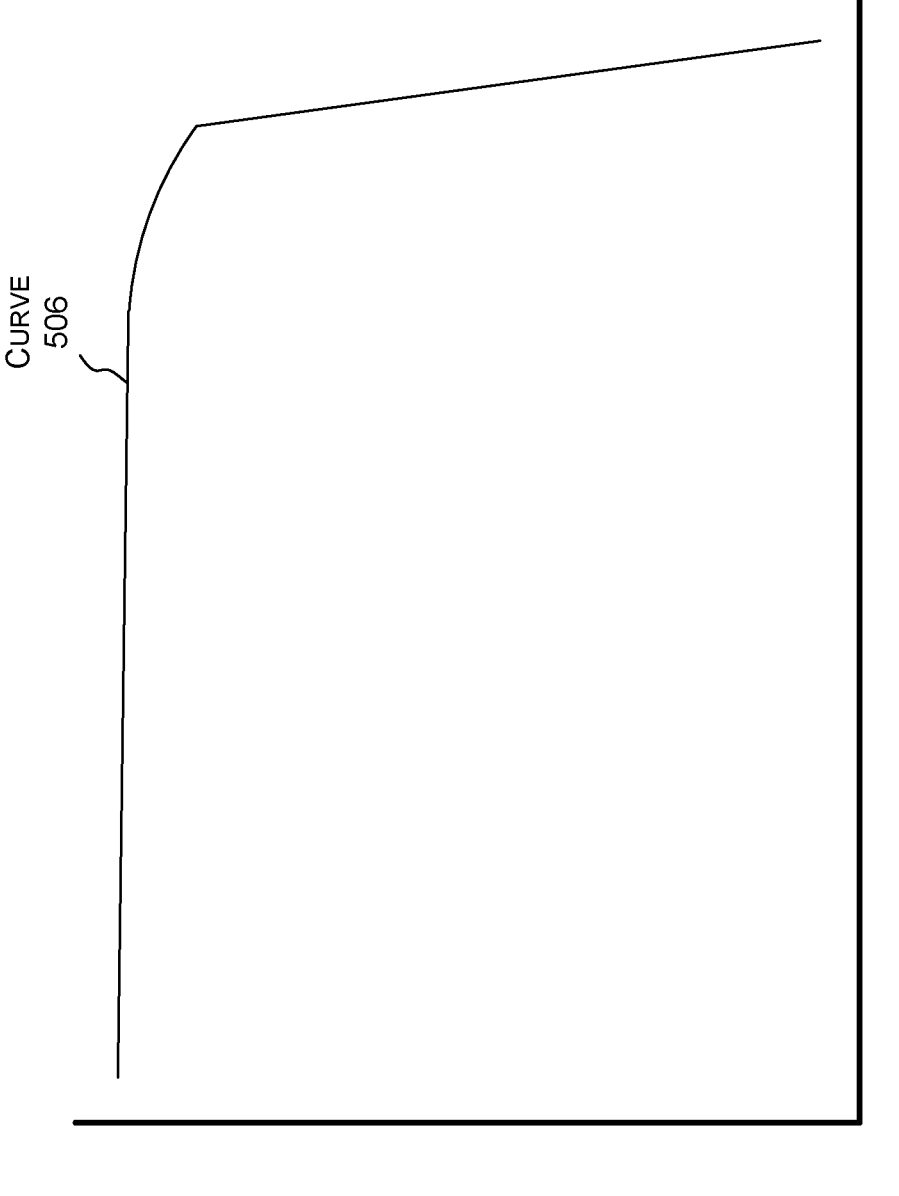
FIG. 5 illustrates an example of a relationship between a precision of a neural network(s) that is trained to retrieve images and a probability threshold used by the neural network(s), in accordance with some embodiments of the present disclosure.

For instance, FIG. 5 illustrates an example of a relationship between a precision 502 of a neural network(s) that is trained to retrieve images and a probability threshold 504 used by the neural network(s), in accordance with some embodiments of the present disclosure. As shown, a curve 506 of the graph indicates that the precision 502 of the neural network(s) increases as the probability threshold 504 decreases since the neural network(s) will retrieve a greater percentage of the actual images that depict the object classification for which the neural network(s) is trained to retrieve. However, the neural network(s) may also retrieve a greater number of images that depict another object classification(s) when the probability threshold 504 decreases. Additionally, the curve 506 of the graph indicates that the precision 502 of the neural network(s) decreases as the probability threshold 504 increases since the neural network(s) will retrieve (or will be used to retrieve) a lesser percentage of the actual images that depict the object classification for which the neural network(s) is trained to retrieve. However, the neural network(s) may also retrieve (or may be used to retrieve) a lesser number of images that depict another object classification(s) when the probability threshold 504 decreases.

Referring back to the example of FIG. 1, in some examples, one or more of the parameters of the specializer component 110 may be configurable, such as by one or more users. For example, the user(s) may configure the one or more object classifications that the specializer component 110 is configured to retrieve, the one or more threshold probabilities that the specializer component 110 is configured to use when retrieving the images, a minimum number of images that the specializer component 110 is configured to retrieve, a maximum number of images that the specializer component 110 is configured to retrieve, a percentage of the images that the specializer component 110 is configured to retrieve, and/or any other parameter. In some examples, the specializer component 110 is updated based on receiving input data 114 representing the parameter(s) set of the user(s). However, in other examples, the specializer component 110 may use a standard parameter(s).

The process 100 may include an anomaly component 116 that is configured to determine uncertainty scores 118 (also referred to as "scores 118", "anomaly scores 118", or "distribution scores 118") for images, where the uncertainty scores 118 are then used by an uncertainty component 120 to determine uncertainty classifications associated with the images. In some examples, the uncertainty score 118 associated with an image may indicate how uncertain the anomaly component 116 is that the object depicted by the image is associated with a specific object classification. For example, the higher the uncertainty score 118, the less certain that the anomaly component 116 is that the object depicted by the image is associated with the specific object classification. Additionally, the lower the uncertainty score 118, the more certain that the anomaly component 116 is that the object depicted by the image is associated with the specific object classification.

In some examples, and as illustrated by the example of FIG. 1, the anomaly component 116 may process image data representing the filtered images 106 output by the remover component 104 and image data representing the filtered images 112 output by the specializer component 110. In some examples, the anomaly component 116 may be configured to only process the image data representing the filtered images 106 or only the image data representing the filtered images 112. Still, in some examples, the anomaly component 116 may be configured to additionally, or alternatively, process the image data 102 representing the first set of images.

To process an image, the anomaly component 116 may use a neural network(s) that is trained to process the image and determine probabilities that an object depicted by the image is associated with different object classifications. For example, the neural network(s) may determine one or more first probabilities that an object (e.g., a street sign) depicted by the image is associated with a first object classification (e.g., a speed limit sign), one or more second probabilities that the object depicted by the image is associated with a second object classification (e.g., a crosswalk sign), one or more third probabilities that the object depicted by the image is associated with a third object classification (e.g., a parking sign), and/or so forth. The anomaly component 116 may then use the probabilities to determine distributions associated with the object classifications. For example, the anomaly component 116 may determine a first distribution associated with the first object classification using the one or more first probabilities, a second distribution associated with the second object classification using the one or more second probabilities, a third distribution associated with the third object classification using the one or more third probabilities, and/or so forth.

The anomaly component 116 may then use the distributions associated with the object classifications to determine the scores 118. For example, the anomaly component 116 may use the first distribution to determine a first score 118 associated with the first object classification, use the second distribution to determine a second score 118 associated with the second object classification, use the third distribution to determine a third score 118 associated with the third object classification, and/or so forth. The anomaly component 116 may then output one or more of the scores 118 to the uncertainty component 120. For example, the anomaly component 116 may output at least the highest score 118 to the uncertainty component 120.

Figure 6A:
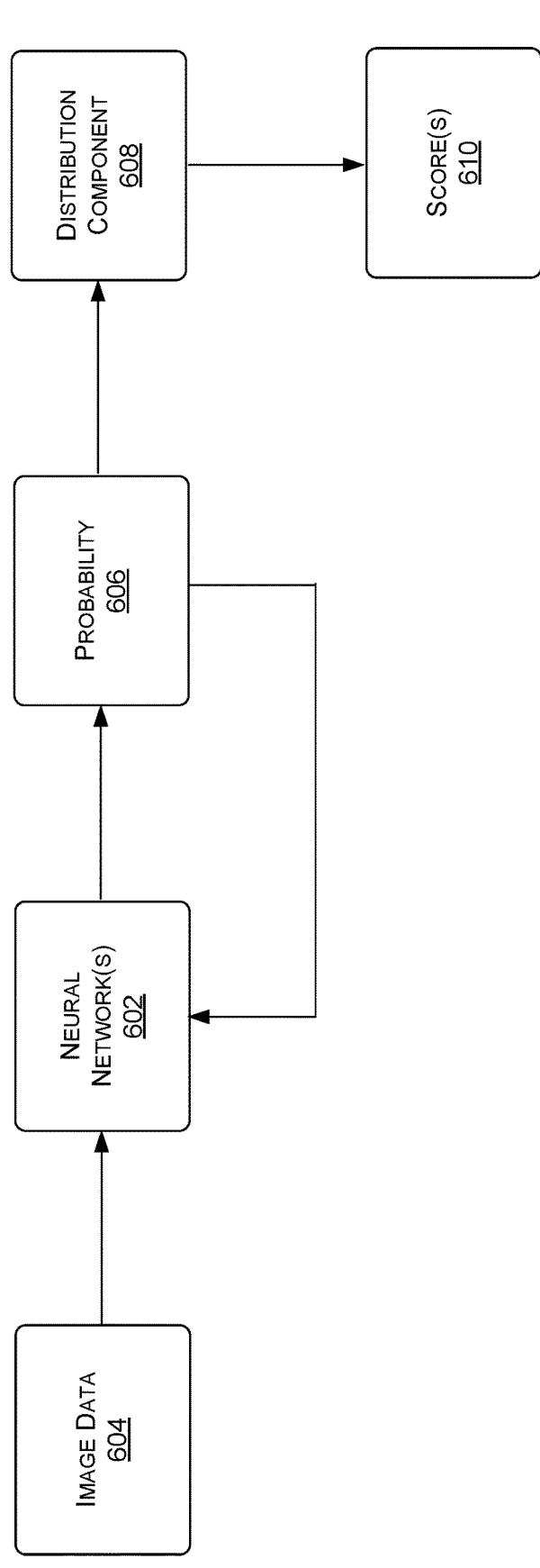
FIG. 6A illustrates a first example of a neural network(s) that is trained to determine probabilities for uncertainty scores associated with images, in accordance with some embodiments of the present disclosure.

In some examples, the anomaly component 116 may use one or more techniques to determine the probabilities associated with the images. For instance, FIG. 6A illustrates a first example of a neural network(s) that is trained to determine probabilities for uncertainty scores associated with images, in accordance with some embodiments of the present disclosure. As shown, an anomaly component 116A may include a neural network(s) 602 that is trained to process image data 604 representative of one or more images (which may represent, and/or include, the filtered images 106 and/or the filtered images 112) in order to determine one or more probabilities 606 associated with the images. In some examples, and for a single image, the neural network(s) 602 processes the image data 604 representative of the image a number of times in order to determine the probabilities 606 associated with the object classifications for the object depicted by the image. The number of times may include, but is not limited to, one time, two times, five times, ten times, one hundred times, and/or any other number of times.

For example, the neural network(s) 602 may process the image data 604 representative of the image a first time in order to determine first respective probabilities 606 associated with the object classifications for the object depicted by the image. In some examples, a first set of neurons associated with the neural network(s) 602 may be activated during the first processing. The neural network(s) 602 may then process the image data 604 representative of the image a second time in order to determine second respective probabilities 606 associated with the object classifications for the object depicted by the image. In some examples, a second, different set of neurons associated with the neural network(s) 602 may be activated during the second processing. The neural network(s) 602 may then process the image data 604 representative of the image a third time in order to determine third respective probabilities 606 associated with the object classifications for the object depicted by the image. In some examples, a third, different set of neurons associated with the neural network(s) 602 may be activated during the third processing. By activating different sets of neurons with each processing, the neural network(s) 602 may determine different probabilities 606 for the same object classifications. Additionally, this process may repeat any number of times.

The anomaly component 116A may then include a distribution component 608 that is trained to use the probabilities 606 to determine distributions associated with the object classifications. For example, the distribution component 608 may determine a first distribution associated with the first object classification using probabilities 606 associated with the first object classification, a second distribution associated with the second object classification using probabilities 606 associated with the second object classification, a third distribution associated with the third object classification using the probabilities 606 associated with the third object classification, and/or so forth. The distribution component 608 may then be configured to use the distributions, along with one or more algorithms (such as the algorithms described herein), to determine scores 610 for the different object classifications.

Figure 6B:
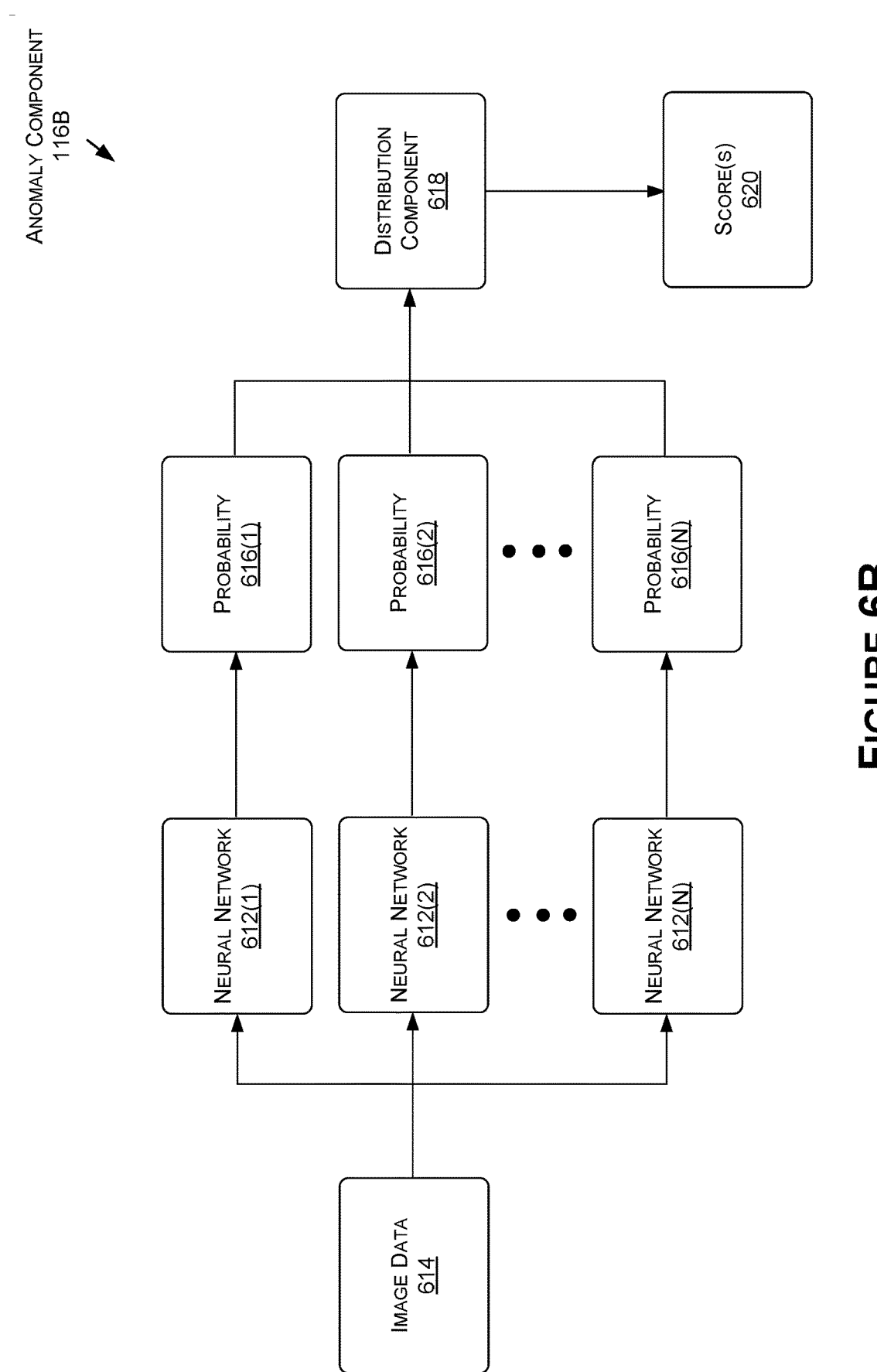
FIG. 6B illustrates a second example of a neural network(s) that is trained to determine probabilities for uncertainty scores associated with images, in accordance with some embodiments of the present disclosure.

In addition to, or alternatively from, passing the image data through the same neural network(s) multiple times, in some examples, the anomaly component 116 may use different neural network(s) to process the image data. For instance, FIG. 6B illustrates a second example of a neural network(s) that is trained to determine probabilities for uncertainty scores associated with images, in accordance with some embodiments of the present disclosure. As shown, an anomaly component 116B now includes a number of neural network(s) 612(1)-(N) that are trained to process image data 614 representative of one or more images (which may represent, and/or include, the filtered images 106 and/or the filtered images 112) in order to determine probabilities 616(1)-(N) associated with the images. In some examples, and for a single image, one or more (e.g., each) of the neural network(s) 612(1)-(N) process the image data 614 representative of the image in order to determine respective probabilities 612(1)-(N) associated with the object classifications for the object depicted by the image. The number of neural network(s) 612(1)-(N) may include, but is not limited to, one neural network(s), two neural network(s), five neural network(s), ten neural network(s), one hundred neural network(s), and/or any other number of neural network(s).

The anomaly component 116 may then include a distribution component 618, which may operate similar to the distribution component 608, by being trained to use the probabilities 616(1)-(N) to determine distributions associated with the object classifications. For example, the distribution component 618 may determine a first distribution associated with the first object classification using probabilities 616(1)-(N) associated with the first object classification, a second distribution associated with the second object classification using probabilities 616(1)-(N) associated with the second object classification, a third distribution associated with the third object classification using probabilities 616(1)-(N) associated with the third object classification, and/or so forth. The distribution component 618 may then be configured to use the distributions, along with one or more algorithms (such as the algorithms described herein), to determine scores 620 for the different object classifications.

Referring back to the example of FIG. 1, the anomaly component 116 (e.g., the distribution component 608 and/or the distribution component 618) may find a posterior weight distribution and quantify prediction uncertainty using statistics, such as entropy. For instance, and using Monte-Carlo dropout, the anomaly component 116 may let:

$$W \sim N(0, 1) \tag{1}$$

$$X = \{x_1, \dots, x_n\} \tag{2}$$

$$Y = \{y_1, \dots, y_n\} \tag{3}$$

The anomaly component 116 then finds:

$$P(W \mid X, Y) = \frac{P(Y \mid X, W)_{P(W)}}{P(Y \mid X)} \tag{4}$$

The anomaly component 116 may then estimate a probability using the following equation:

$$P(W \mid X, Y) \approx q_\theta(W) \tag{5}$$

Next, for the distribution, the anomaly component 116 may use the following equations:

$$p(y = c \mid x, Y, X) = \frac{1}{T} \sum_{t=1}^{T} \text{Softmax}(f^{w_t}(x)) \tag{6}$$

$$w_t \sim q_\theta(W) : \text{Dropout Distribution} \tag{7}$$

$$U_{epistemic} = -\sum_c p_c \log(p_c) \tag{8}$$

The anomaly component 116 may further determine an output prediction based on the following equation:

$$y_i = \frac{1}{T} \sum_{t=1}^{T} f_{w_t}(x_i) \tag{9}$$

In equation (9), T is the number of dropout samples, $x_i$ is the input sample, $y_i$ is the output prediction, and $w_t$ is a weight sample from the dropout distribution. The anomaly component 116 may then determine a score 118, such as by using Entropy, by the following equation:

$$H(y_i) = -\sum_{c=1}^{C} p_c(y_i) \log(p_c(y_i)) \tag{10}$$

In equation (10), C is a number of object classifications and pc is a probability (e.g., a Softmax probability) of class c.

While these examples describe determining the scores 118 as Entropy scores, in other examples, the anomaly component 116 may use one or more additional and/or alternative techniques to determine the scores 118. For example, and for an image, the anomaly component 116 may determine the score 118 based on the average of the probabilities, the minimum of the probabilities, the maximum of the probabilities, a difference between the minimum of the probabilities and the maximum of the probabilities, and/or using any other technique.

The process 100 may then include the uncertainty component 120 determining uncertainty classifications associated with the images using the scores 118. As described herein, the uncertainty classifications may include a first uncertainty classification associated with images that should receive an additional review, such as from one or more users, since the objects depicted by the images may be difficult to identify using machine learning. The uncertainty classifications may also include a second uncertainty classification associated with images that do not need to receive an additional review, such as from the one or more users, since the objects depicted by the images may be easy to identify using machine learning. While these are just two examples of uncertainty classifications that the uncertainty component 120 may be configured to identify, in other examples, the uncertainty component 120 may be configured to identify additional and/or alternative uncertainty classifications.

In some examples, the uncertainty component 120 may use a threshold score in order to determine the uncertainty classifications associated with the images. For example, and for an image, if the uncertainty component 120 determines that the score 118 associated with the image is less than the threshold score, then the uncertainty component 120 may associate the image with an uncertainty classification (e.g., the second uncertainty classification may not need to receive an additional review). Additionally, if the uncertainty component 120 determines that the score 118 is equal to or greater than the threshold score, then the uncertainty component 120 may associate the image with another uncertainty classification (e.g., the first uncertainty classification that should receive an additional review).

In some examples, the uncertainty component 120 may use one or more other techniques to determine the uncertainty classifications associated with the images based on the scores 118. For example, if a first object classification is associated with many images (e.g., thousands of images), such that the images depict objects associated with the first object classification, then the scores 118 associated with those images may tend to be low. Alternatively, if a second object classification is associated with few images (e.g., two images), such that these images depict objects that are associated with the second object classification, then the scores 118 associated with these images may tend to be high. This may be because the anomaly component 116 (e.g., the neural network(s) used by the anomaly component 116) is better at detecting objects associated with object classifications for which many data examples exist as compared to objects associated with object classifications for which few data examples exist. Because of this, the uncertainty component 120 may not use a threshold score and/or the same threshold score for multiple object classifications.

Rather, the uncertainty component 120 may use a per class thresholding technique to determine the uncertainty classifications for the images based on the scores 118. For instance, and for an object classification, the uncertainty component 120 may use an algorithm (e.g., a K-Means algorithm) that starts a first cluster at the highest end of the scores 118 and a second cluster at the lowest end of the scores 118. The uncertainty component 120 may then move the first cluster and the second cluster closer together. Next, using the clusters, the uncertainty component 120 then determines the uncertainty classifications associated with the images. For example, and for an image, if the value 118 associated with the image is closer to a value associated with the first cluster, then the uncertainty component 120 may associate with the image with one of the uncertainty classifications (e.g., the first uncertainty classification that should receive an additional review). Additionally, if the value 118 associated with the image is closer to a value associated with the second cluster, then the uncertainty component 120 may associate with the image with another uncertainty classification (e.g., the second uncertainty classification that does not need to receive an additional review). The uncertainty component 120 may then perform similar processes for one or more additional object classifications (e.g., each object classification).

For instance, FIG. 7 illustrates an example of determining uncertainty classifications associated with images, in accordance with some embodiments of the present disclosure. In the example of FIG. 7, the uncertainty component 120 may generate a histogram 702 that illustrates a number of images 704 that are associated with different uncertainty scores 706 (which may represent, and/or include, the scores 118). The uncertainty component 120 may then determine an easy clustering mean 708 and a hard clustering mean 710 associated with the histogram and use the easy clustering mean 708 and the hard clustering mean 710 to determine the uncertainty classifications associated with the images.

For example, the uncertainty component 120 may determine that images that are associated with the uncertainty scores 706 that are closer to the easy clustering mean 708 as compared to the hard clustering mean 710 should be associated with the second uncertainty classification. This is because those images may not require an additional review. The uncertainty component 120 may also determine that images that are associated with the uncertainty scores 706 that are closer to the hard clustering mean 710 as compared to the easy clustering mean 708 should be associated with the first uncertainty classification. This is because those images may need an additional review Referring back to the example of FIG. 1, the process 100 may include the uncertainty component 120 outputting image data representing labeled images 124 to a combiner component 124, such as a multiplexer. The labeled images 122 may include the filtered images 106 and/or the filtered images 112 processed by the anomaly component 116 and the uncertainty component 120, but labeled with the uncertainty classifications. In the example of FIG. 1, the combiner component 124 may also receive the image data representing the filtered images 106 from the remover component 104 and/or the image data representing the filtered images 122 from the specializer component 110. The combiner component 124 may then be configured to determine which images 126 are sent to a classification component 128 for further analysis. For instance, the images 126 may include one or more images from the labeled images 122, one or more images from the filtered images 106, and/or one or more images from the filtered images 112.

The process 100 may then include the classification component 128 processing image data representing the images 126 in order to determine final object classifications associated with the objects depicted by the images 126. For instance, the classification component 128 may include a neural network(s) that is trained to process the image data in order to determine the object classifications. As described herein, in some examples, and for a single image, the neural network(s) may be trained to output a respective probability for one or more (e.g., each) object classification for which the neural network(s) is trained to identify. For example, and for an image, the neural network(s) may be trained to determine a first probability that an object (e.g., a street sign) depicted by the image is associated with a first object classification (e.g., a speed limit sign), a second probability that the object depicted by the image is associated with a second object classification (e.g., a crosswalk sign), a third probability that the object depicted by the image is associated with a third object classification (e.g., a parking sign), and/or so forth.

The classification component 128 (e.g., the neural network(s)) may then determine final object classifications associated with the images using the probabilities. For example, and for an image, the classification component 128 may select the object classification that is associated with the highest probability. The classification component 128 may then output data 130. The output data 130 may include, but is not limited to, image data representing the images (e.g., the images 126) processed by the classification component 128, data representing the uncertainty classifications associated with the images, data representing the object classifications associated with the images, and/or any other type of data.

Figure 8:
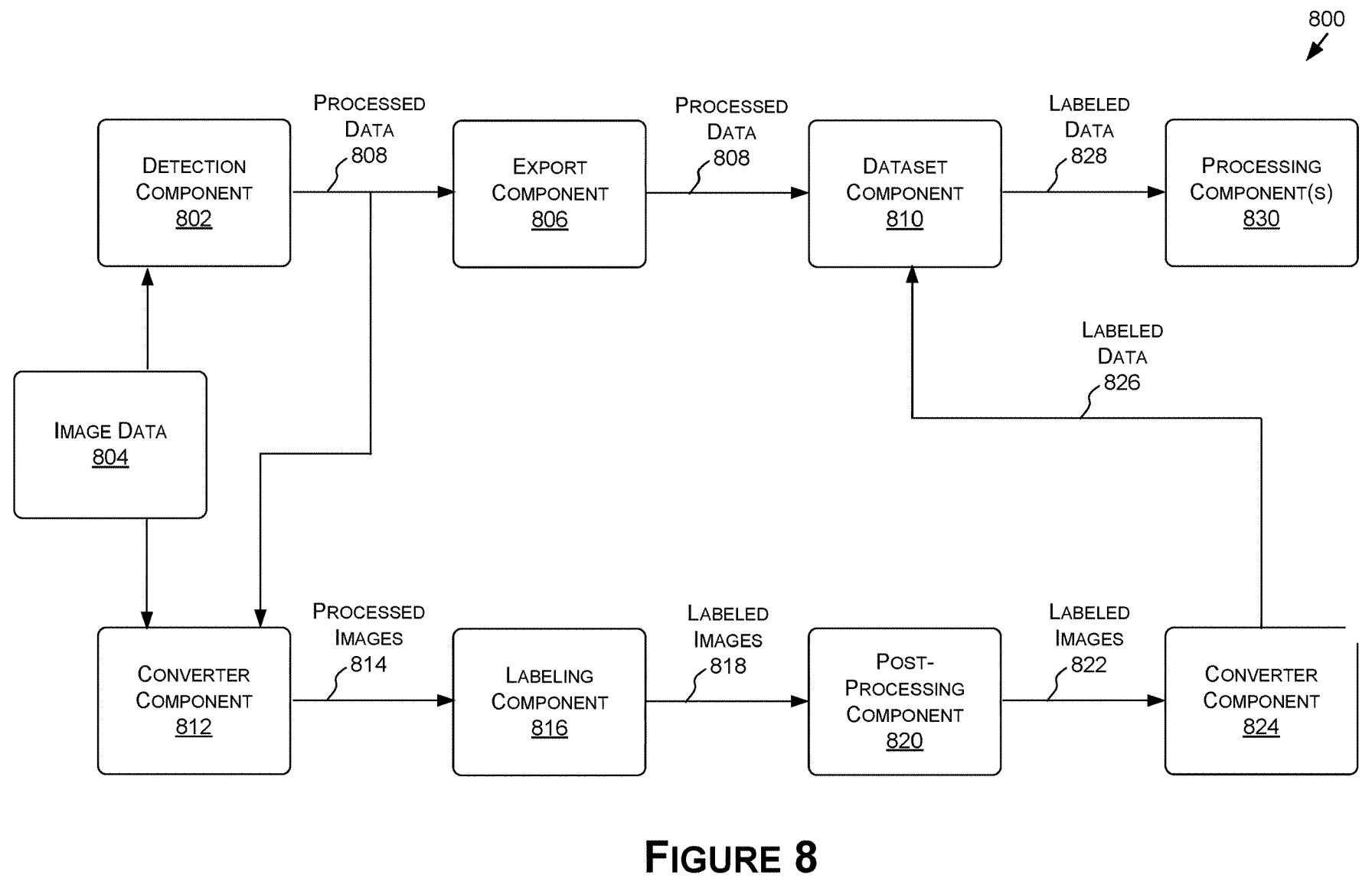

In some examples, the process 100 may be included as part of a larger process in order to label images for further processing. For instance, FIG. 8 illustrates an example data flow diagram for a process 800 of automatically labeling images for later processing, in accordance with some embodiments of the present disclosure. As shown, the process 800 may include a detection component 802 receiving image data 804 representative of images that have yet to be labeled, such as images that have yet to be labeled with object classifications. The detection component 802 may then process the image data 804, such as by using one or more neural networks, in order to detect objects depicted by the images. In some examples, the detection component 802 (e.g., the neural network(s)) may then be configured to generate pre-labels indicating object classifications for the objects depicted by the images, generate bounding shapes indicating the locations of the objects within the images, and/or generate cropped images of the objects.

The process 800 may include an export component 806 that is configured to export processed data 808, which is received from the detection component 802, to a dataset component 810. The processed data 808 may represent the pre-labels for the images indicating the object classifications of the objects, the bounding shapes indicating the locations of the objects within the images, and/or the cropped images of the objects.

The process 800 may include a converter component 812 that is configured to generate cropped images (and/or retrieve the copped images) depicting the objects. For example, the converter component 812 may receive the image data 804 representing the images along with the processed data 808 representing at least the bounding shapes indicating the locations of the objects within the images. The converter component 812 may then use the processed data 808 to determine the locations of the objects within the images. Based on the locations, the converter component 812 may then generate the cropped images of the objects. In some examples, the converter component 812 may also be configured to perform one or more other image processing techniques on the images. The converter component 812 may then output image data representing the processed images 814 (e.g., the cropped images) to a labeling component 816.

The labeling component 816 may be configured to perform at least a portion of the process 100 in order to label the images (e.g., the cropped images). For example, the labeling component 816 may include the remover component 104, the specializer component 110, the anomaly component 116, the uncertainty component 120, the combiner component 124, and/or the classification component 128. The labeling component 816 may then output data (which may represent, and/or include, at least a portion of the output data 130) representing at least labeled images 818. Additionally, the output data may include data representing the uncertainty classifications associated with the labeled images 818, data representing the object classifications associated with the labeled images 818, and/or any other type of data.

The process 800 may include a post-processing component 820 that is configured to determine final object classifications for the labeled images 818. For instance, and in some examples, the post-processing may include providing at least a portion of the labeled images 818, such as the images that are labeled with the uncertainty classification (e.g., the first uncertainty classification in the examples above) that is associated with receiving an additional review, to one or more users for further analysis. Based on providing the at least the portion of the labeled images 818, the post-processing may include receiving indications of whether the object classification labels are correct or incorrect. In some examples, such as when the labels are incorrect, the post-processing may further include receiving indications of the actual object classifications for the images and relabeling the images with the actual object classifications.

The post-processing component 820 may then output data representing at least labeled images 822. For example, the output data may include data representing the uncertainty classifications associated with the images, data representing the actual object classifications associated with the labeled images 822, and/or any other type of data.

The process 800 may include a converter component 824 that sends labeled data 826 to the dataset component 810. The labeled data 824 may include, but is not limited to, image data representing the images (e.g., the cropped images), data representing the uncertainty classifications associated with the images, data representing the actual object classifications associated with the images, and/or any other type of data. The dataset component 810 may then use the processed data 808 and/or the labeled data 810 to generate final labeled data 828. For example, the dataset component 810 may generate at least labeled images that are in a format for further processing.

For instance, the process 800 may include a processing component(s) 830 that performs one or more processes using the final labeled data 828. For a first example, the processing component(s) 830 may use the final labeled data 828 to train one or more neural networks, such as one or more neural networks to detect objects and/or detect specific classifications of objects. For example, the image data may be applied as input to a neural network(s) and the outputs of the neural network(s) may be compared to the labels (classifications, locations, etc.) as ground truth data, using one or more loss functions, until an acceptable level of accuracy or precision is reached (e.g., until the neural network(s) converges). For a second example, the processing component(s) 830 may provide the labeled images to one or more users for further analysis. While these are just a couple examples of processes that may be performed by the processing component(s) 830, in other examples, the processing component(s) 830 may perform any other type of processing using the labeled data 828.

Figure 10:
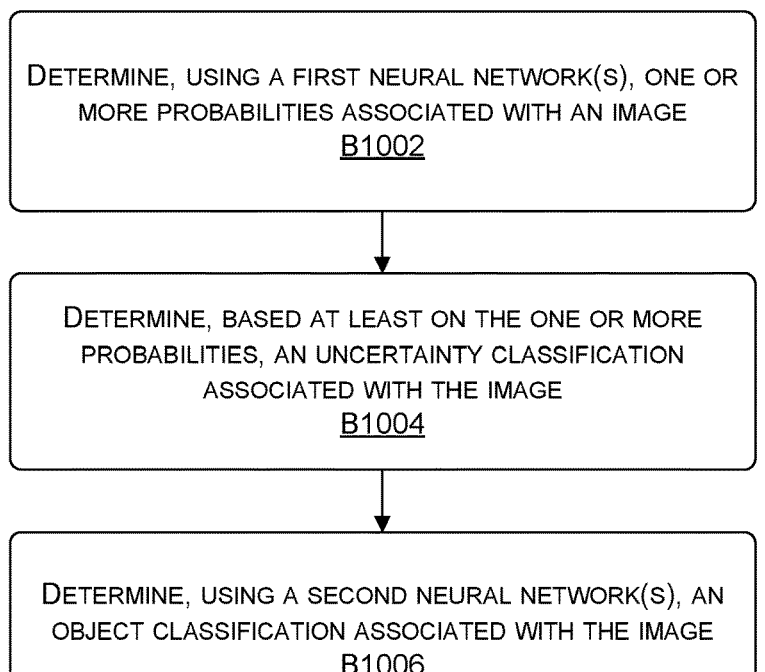
FIG. 10 is a flow diagram showing a method for automatically labeling an image using neural networks, in accordance with some embodiments of the present disclosure.

Now referring to FIGS. 9 and 10, each block of methods 900 and 1000, described herein, comprises a computing process that may be performed using any combination of hardware, firmware, and/or software. For instance, various functions may be carried out by a processor executing instructions stored in memory. The methods 900 and 1000 may also be embodied as computer-usable instructions stored on computer storage media. The methods 900 and 1000 may be provided by a standalone application, a service or hosted service (standalone or in combination with another hosted service), or a plug-in to another product, to name a few. In addition, the method 900 and 1000 are described, by way of example, with respect to FIG. 1. However, these methods 900 and 1000 may additionally or alternatively be executed by any one system, or any combination of systems, including, but not limited to, those described herein.

FIG. 9 is a flow diagram showing a method 900 for performing data mining using neural networks in order to label images, in accordance with some embodiments of the present disclosure. The method 900, at block B902, may include receiving first image data 102 representative of a first set of images. For instance, the remover component 104 and/or the specializer component 110 may receive the first image data 102 representative of the first set of images, where the first set of images may include any number of images (e.g., one image, ten images, one hundred images, one thousand images, one million images, etc.). In some examples, the first set of images are associated with a broad object classification, such as vehicles, street signs, pedestrians, road markings, structures, and/or the like. In some examples, the first image data 102 is generated using one or more vehicles, such as one or more vehicles navigating around one or more environments.

The method 900, at block B904, may include determining, using a first neural network(s), one or more first images of the first set of images to generate second image data representative of a second set of images. For instance, in some examples, the remover component 104 may process the first image data 102 in order to remove one or more images associated with one or more object classifications. Based on the processing, the remover component 104 may generate at least a portion of the second image data representative of the filtered images 106. In some examples, the specializer component 110 may process the first image data 102 in order to retrieve one or more images associated with one or more object classifications. Based on the processing, the specializer component 110 may generate at least a portion of the second image data representative of the filtered images 112.

The method 900, at block B906, may include determining, using a second neural network(s), one or more uncertainty classifications associated with one or more second images of the second set of images. For instance, the anomaly component 116 may process the second image data in order to determine one or more uncertainty scores 118 associated with the one or more second images of the second set of images. The uncertainty component 120 may then use the one or more uncertainty scores 118 to determine the one or more uncertainty classifications associated with the one or more second images.

The method 900, at block B908, may include determining, using a third neural network(s), one or more object classifications associated with the one or more second images of the second set of images. For instance, the classification component 128 may process the second image data to determine the one or more object classifications associated with the one or more second images of the second set of images. In some examples, the second image data, data representing the one or more uncertainty classifications, and data representing the object classifications may then be sent to one or more system(s) for further processing.

FIG. 10 is a flow diagram showing a method 1000 for automatically labeling an image, in accordance with some embodiments of the present disclosure. The method 1000, at block B1002, may include determining, using a first neural network(s), one or more probabilities associated with an image. For instance, the anomaly component 116 may process image data representative of the image in order to determine the one or more probabilities. In some examples, the anomaly component 116 may process the image data multiple times using the first neural network(s) to determine multiple probabilities. In some examples, the anomaly component 116 may process the image data using different neural networks of the first neural network(s) to determine multiple probabilities. In either of the examples, and as described herein, the anomaly component 116 may determine one or more respective probabilities for one or more different object classifications.

The method 1000, at block B1004, may include determining, based at least on the one or more probabilities, an uncertainty classification associated with the image. For instance, the anomaly component 116 may use the one or more probabilities to determine at least an uncertainty score 118. In some examples, the anomaly component 116 may determine the uncertainty score 118 by determining uncertainty scores 118 for different object classifications, using the probabilities, and then selecting the highest uncertainty score 118. The uncertainty component 120 may then use the uncertainty score 118 to determine the uncertainty classification for the image. As described herein, the uncertainty classification may include a first uncertainty classification associated with receiving an additional review, such as from one or more users, since the object depicted by the image may be difficult to identify using machine learning. Alternatively, the uncertainty classifications may include a second uncertainty classification associated with not needing an additional review, such as from the one or more users, since the object depicted by the image may be easy to identify using machine learning.

The method 1000, at block B1006, may include determining, using a second neural network(s), an object classification associated with the image. For instance, the classification component 128 may process image data representative of the image to determine the object classification associated with the image.

Example Autonomous Vehicle

Figure 11A:
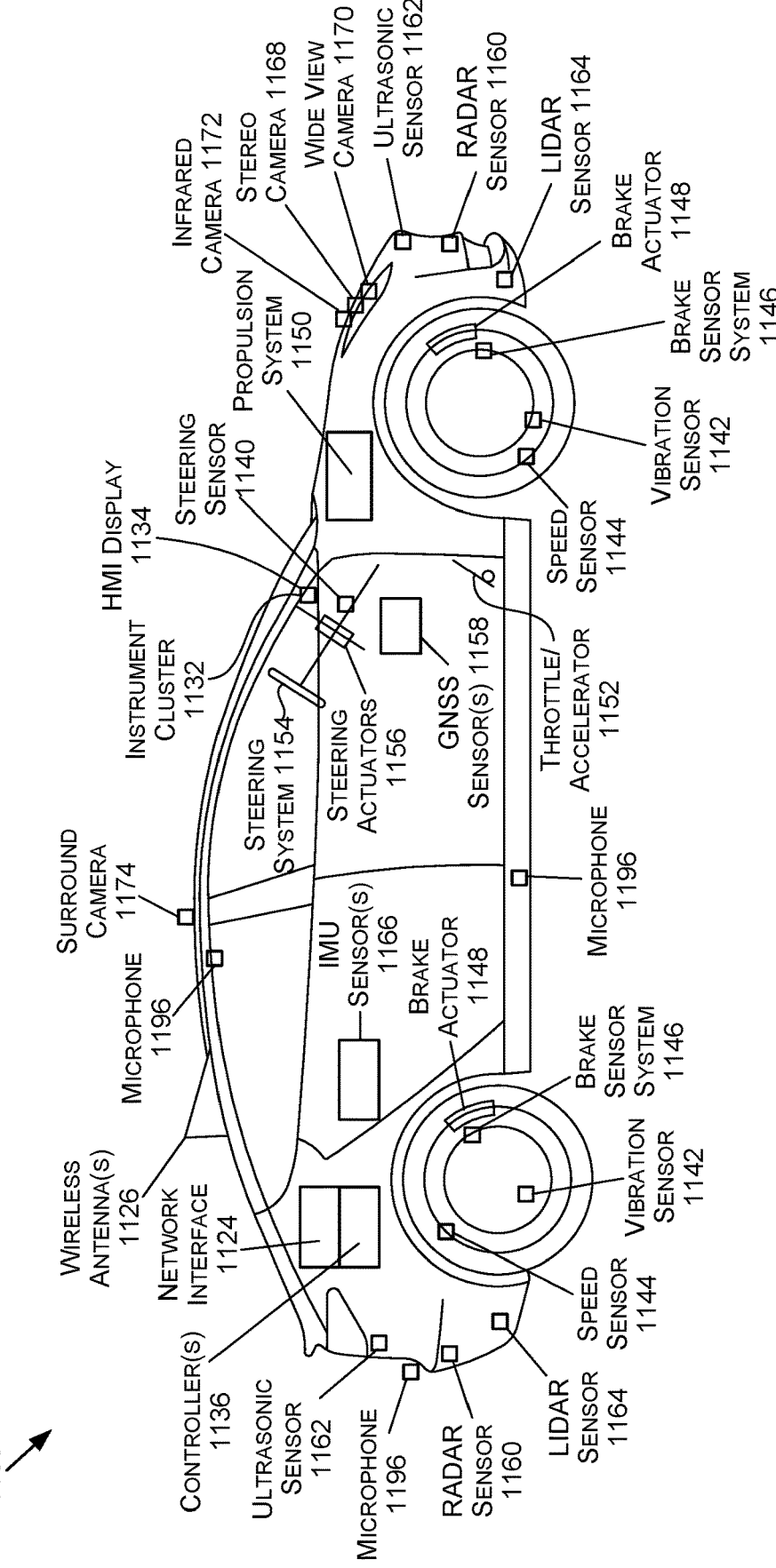
FIG. 11A is an illustration of an example autonomous vehicle, in accordance with some embodiments of the present disclosure.

FIG. 11A is an illustration of an example autonomous vehicle 1100, in accordance with some embodiments of the present disclosure. The autonomous vehicle 1100 (alternatively referred to herein as the "vehicle 1100") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On- Road Motor Vehicles" (Standard No. J3016-201806, published on Jun. 15, 2018, Standard No. J3016-201609, published on Sep. 30, 2016, and previous and future versions of this standard). The vehicle 1100 may be capable of functionality in accordance with one or more of Level 3-Level 5 of the autonomous driving levels. The vehicle 1100 may be capable of functionality in accordance with one or more of Level 1-Level 5 of the autonomous driving levels. For example, the vehicle 1100 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1100 or other machine, such as being fully autonomous, being highly autonomous, being conditionally autonomous, being partially autonomous, providing assistive autonomy, being semi-autonomous, being primarily autonomous, or other designation.

The vehicle 1100 may include components such as a chassis, a vehicle body, wheels (e.g., 2, 4, 6, 8, 18, etc.), tires, axles, and other components of a vehicle. The vehicle 1100 may include a propulsion system 1150, such as an internal combustion engine, hybrid electric power plant, an all-electric engine, and/or another propulsion system type. The propulsion system 1150 may be connected to a drive train of the vehicle 1100, which may include a transmission, to enable the propulsion of the vehicle 1100. The propulsion system 1150 may be controlled in response to receiving signals from the throttle/accelerator 1152.

A steering system 1154, which may include a steering wheel, may be used to steer the vehicle 1100 (e.g., along a desired path or route) when the propulsion system 1150 is operating (e.g., when the vehicle is in motion). The steering system 1154 may receive signals from a steering actuator 1156. The steering wheel may be optional for full automation (Level 5) functionality.

The brake sensor system 1146 may be used to operate the vehicle brakes in response to receiving signals from the brake actuators 1148 and/or brake sensors.

Controller(s) 1136, which may include one or more system on chips (SoCs) 1104 (FIG. 11C) and/or GPU(s), may provide signals (e.g., representative of commands) to one or more components and/or systems of the vehicle 1100. For example, the controller(s) may send signals to operate the vehicle brakes via one or more brake actuators 1148, to operate the steering system 1154 via one or more steering actuators 1156, to operate the propulsion system 1150 via one or more throttle/accelerators 1152. The controller(s) 1136 may include one or more onboard (e.g., integrated) computing devices (e.g., supercomputers) that process sensor signals, and output operation commands (e.g., signals representing commands) to enable autonomous driving and/or to assist a human driver in driving the vehicle 1100. The controller(s) 1136 may include a first controller 1136 for autonomous driving functions, a second controller 1136 for functional safety functions, a third controller 1136 for artificial intelligence functionality (e.g., computer vision), a fourth controller 1136 for infotainment functionality, a fifth controller 1136 for redundancy in emergency conditions, and/or other controllers. In some examples, a single controller 1136 may handle two or more of the above functionalities, two or more controllers 1136 may handle a single functionality, and/or any combination thereof.

The controller(s) 1136 may provide the signals for controlling one or more components and/or systems of the vehicle 1100 in response to sensor data received from one or more sensors (e.g., sensor inputs). The sensor data may be received from, for example and without limitation, global navigation satellite systems ("GNSS") sensor(s) 1158 (e.g., Global Positioning System sensor(s)), RADAR sensor(s) 1160, ultrasonic sensor(s) 1162, LIDAR sensor(s) 1164, inertial measurement unit (IMU) sensor(s) 1166 (e.g., accelerometer(s), gyroscope(s), magnetic compass(es), magnetometer(s), etc.), microphone(s) 1196, stereo camera(s) 1168, wide-view camera(s) 1170 (e.g., fisheye cameras), infrared camera(s) 1172, surround camera(s) 1174 (e.g., 360 degree cameras), long-range and/or mid-range camera(s) 1198, speed sensor(s) 1144 (e.g., for measuring the speed of the vehicle 1100), vibration sensor(s) 1142, steering sensor(s) 1140, brake sensor(s) (e.g., as part of the brake sensor system 1146), and/or other sensor types.

One or more of the controller(s) 1136 may receive inputs (e.g., represented by input data) from an instrument cluster 1132 of the vehicle 1100 and provide outputs (e.g., represented by output data, display data, etc.) via a human-machine interface (HMI) display 1134, an audible annunciator, a loudspeaker, and/or via other components of the vehicle 1100. The outputs may include information such as vehicle velocity, speed, time, map data (e.g., the High Definition ("HD") map 1122 of FIG. 11C), location data (e.g., the vehicle's 1100 location, such as on a map), direction, location of other vehicles (e.g., an occupancy grid), information about objects and status of objects as perceived by the controller(s) 1136, etc. For example, the HMI display 1134 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1100 further includes a network interface 1124 which may use one or more wireless antenna(s) 1126 and/or modem(s) to communicate over one or more networks. For example, the network interface 1124 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1126 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 11B:
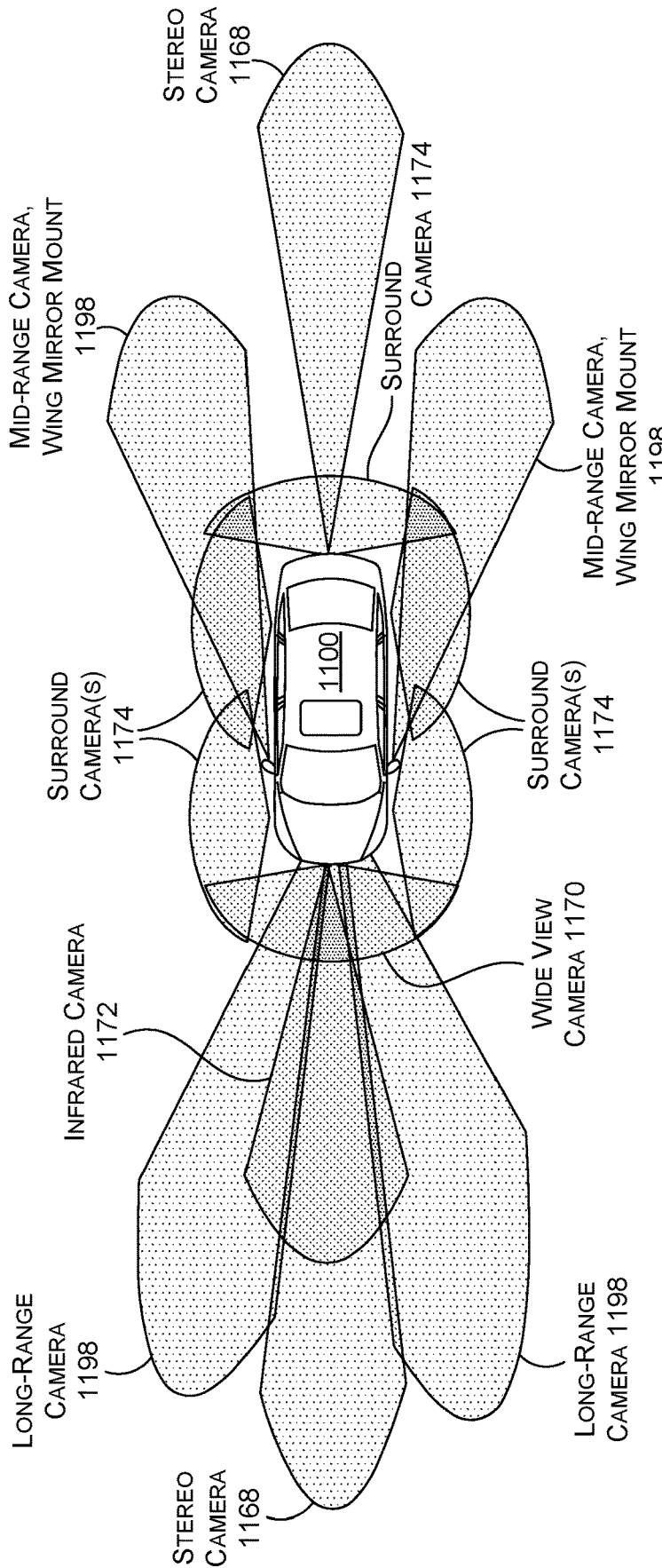
FIG. 11B is an example of camera locations and fields of view for the example autonomous vehicle of FIG. 11A, in accordance with some embodiments of the present disclosure.

FIG. 11B is an example of camera locations and fields of view for the example autonomous vehicle 1100 of FIG. 11A, in accordance with some embodiments of the present disclosure. The cameras and respective fields of view are one example embodiment and are not intended to be limiting. For example, additional and/or alternative cameras may be included and/or the cameras may be located at different locations on the vehicle 1100.

The camera types for the cameras may include, but are not limited to, digital cameras that may be adapted for use with the components and/or systems of the vehicle 1100. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1100 (e.g., front-facing cameras) may be used for surround view, to help identify forward facing paths and obstacles, as well aid in, with the help of one or more controllers 1136 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1170 that may be used to perceive objects coming into view from the periphery (e.g., pedestrians, crossing traffic or bicycles). Although only one wide-view camera is illustrated in FIG. 11B, there may be any number (including zero) of wide-view cameras 1170 on the vehicle 1100. In addition, any number of long-range camera(s) 1198 (e.g., a long-view stereo camera pair) may be used for depth-based object detection, especially for objects for which a neural network has not yet been trained. The long-range camera(s) 1198 may also be used for object detection and classification, as well as basic object tracking.

Any number of stereo cameras 1168 may also be included in a front-facing configuration. In at least one embodiment, one or more of stereo camera(s) 1168 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1168 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1168 may be used in addition to, or alternatively from, those described herein.

Cameras with a field of view that include portions of the environment to the side of the vehicle 1100 (e.g., side-view cameras) may be used for surround view, providing information used to create and update the occupancy grid, as well as to generate side impact collision warnings. For example, surround camera(s) 1174 (e.g., four surround cameras 1174 as illustrated in FIG. 11B) may be positioned to on the vehicle 1100. The surround camera(s) 1174 may include wide-view camera(s) 1170, fisheye camera(s), 360 degree camera(s), and/or the like. Four example, four fisheye cameras may be positioned on the vehicle's front, rear, and sides. In an alternative arrangement, the vehicle may use three surround camera(s) 1174 (e.g., left, right, and rear), and may leverage one or more other camera(s) (e.g., a forward-facing camera) as a fourth surround view camera.

Cameras with a field of view that include portions of the environment to the rear of the vehicle 1100 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1198, stereo camera(s) 1168), infrared camera(s) 1172, etc.), as described herein.

Figure 11C:
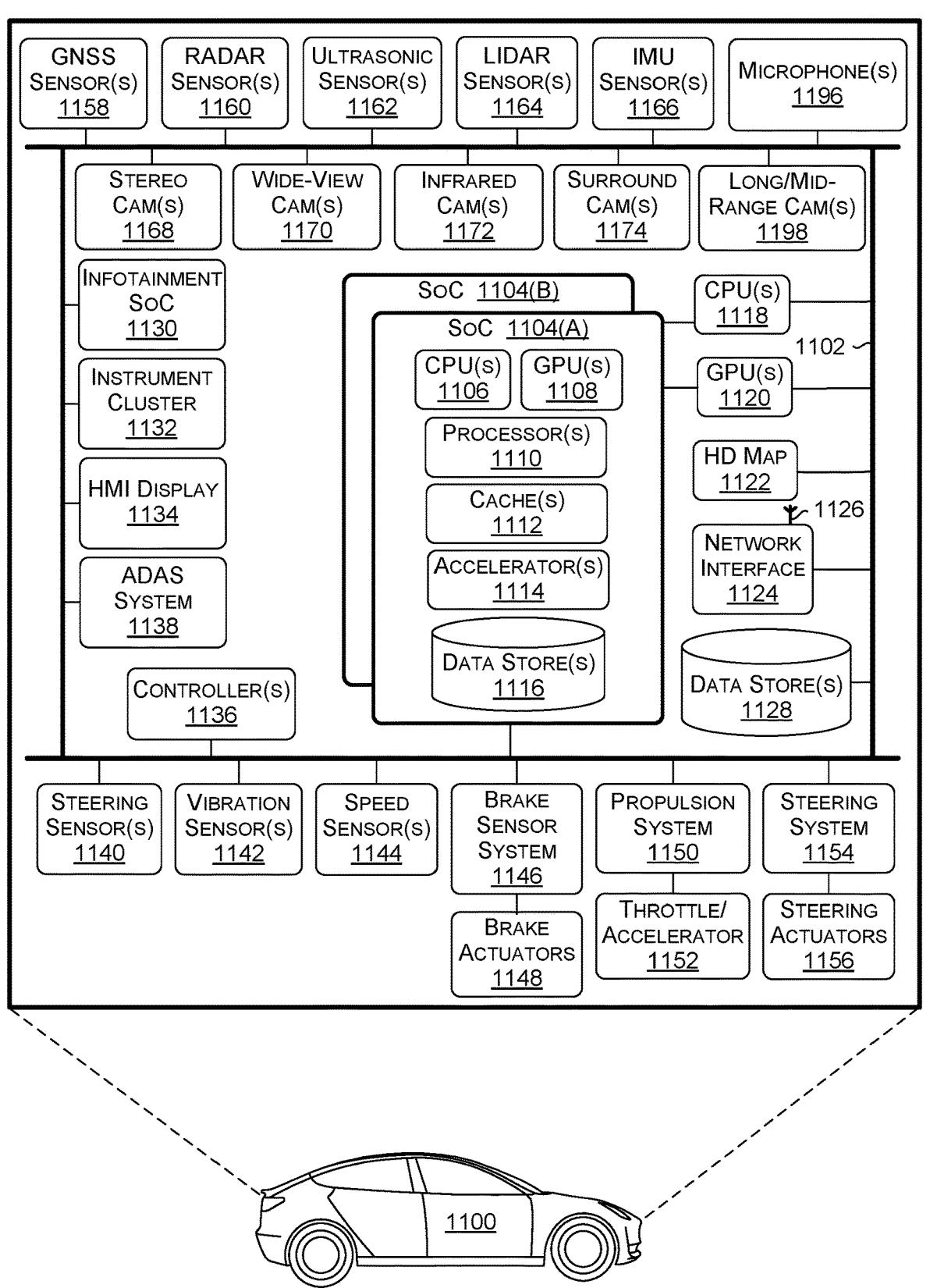
FIG. 11C is a block diagram of an example system architecture for the example autonomous vehicle of FIG. 11A, in accordance with some embodiments of the present disclosure.

FIG. 11C is a block diagram of an example system architecture for the example autonomous vehicle 1100 of FIG. 11A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1100 in FIG. 11C are illustrated as being connected via bus 1102. The bus 1102 may include a Controller Area Network (CAN) data interface (alternatively referred to herein as a "CAN bus"). A CAN may be a network inside the vehicle 1100 used to aid in control of various features and functionality of the vehicle 1100, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1102 is described herein as being a CAN bus, this is not intended to be limiting. For example, in addition to, or alternatively from, the CAN bus, FlexRay and/or Ethernet may be used. Additionally, although a single line is used to represent the bus 1102, this is not intended to be limiting. For example, there may be any number of busses 1102, which may include one or more CAN busses, one or more FlexRay busses, one or more Ethernet busses, and/or one or more other types of busses using a different protocol. In some examples, two or more busses 1102 may be used to perform different functions, and/or may be used for redundancy. For example, a first bus 1102 may be used for collision avoidance functionality and a second bus 1102 may be used for actuation control. In any example, each bus 1102 may communicate with any of the components of the vehicle 1100, and two or more busses 1102 may communicate with the same components. In some examples, each SoC 1104, each controller 1136, and/or each computer within the vehicle may have access to the same input data (e.g., inputs from sensors of the vehicle 1100), and may be connected to a common bus, such the CAN bus.

The vehicle 1100 may include one or more controller(s) 1136, such as those described herein with respect to FIG. 11A. The controller(s) 1136 may be used for a variety of functions. The controller(s) 1136 may be coupled to any of the various other components and systems of the vehicle 1100, and may be used for control of the vehicle 1100, artificial intelligence of the vehicle 1100, infotainment for the vehicle 1100, and/or the like.

The vehicle 1100 may include a system(s) on a chip (SoC) 1104. The SoC 1104 may include CPU(s) 1106, GPU(s) 1108, processor(s) 1110, cache(s) 1112, accelerator(s) 1114, data store(s) 1116, and/or other components and features not illustrated. The SoC(s) 1104 may be used to control the vehicle 1100 in a variety of platforms and systems. For example, the SoC(s) 1104 may be combined in a system (e.g., the system of the vehicle 1100) with an HD map 1122 which may obtain map refreshes and/or updates via a network interface 1124 from one or more servers (e.g., server(s) 1178 of FIG. 11D).

The CPU(s) 1106 may include a CPU cluster or CPU complex (alternatively referred to herein as a "CCPLEX"). The CPU(s) 1106 may include multiple cores and/or L2 caches. For example, in some embodiments, the CPU(s) 1106 may include eight cores in a coherent multi-processor configuration. In some embodiments, the CPU(s) 1106 may include four dual-core clusters where each cluster has a dedicated L2 cache (e.g., a 2 MB L2 cache). The CPU(s) 1106 (e.g., the CCPLEX) may be configured to support simultaneous cluster operation enabling any combination of the clusters of the CPU(s) 1106 to be active at any given time.

The CPU(s) 1106 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1106 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1108 may include an integrated GPU (alternatively referred to herein as an "iGPU"). The GPU(s) 1108 may be programmable and may be efficient for parallel workloads. The GPU(s) 1108, in some examples, may use an enhanced tensor instruction set. The GPU(s) 1108 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1108 may include at least eight streaming microprocessors. The GPU(s) 1108 may use compute application programming interface(s) (API(s)). In addition, the GPU(s) 1108 may use one or more parallel computing platforms and/or programming models (e.g., NVIDIA's CUDA).

The GPU(s) 1108 may be power-optimized for best performance in automotive and embedded use cases. For example, the GPU(s) 1108 may be fabricated on a Fin field-effect transistor (FinFET). However, this is not intended to be limiting and the GPU(s) 1108 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1108 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1108 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1108 to access the CPU(s) 1106 page tables directly. In such examples, when the GPU(s) 1108 memory management unit (MMU) experiences a miss, an address translation request may be transmitted to the CPU(s) 1106. In response, the CPU(s) 1106 may look in its page tables for the virtual-to-physical mapping for the address and transmits the translation back to the GPU(s) 1108. As such, unified memory technology may allow a single unified virtual address space for memory of both the CPU(s) 1106 and the GPU(s) 1108, thereby simplifying the GPU(s) 1108 programming and porting of applications to the GPU(s) 1108.

In addition, the GPU(s) 1108 may include an access counter that may keep track of the frequency of access of the GPU(s) 1108 to memory of other processors. The access counter may help ensure that memory pages are moved to the physical memory of the processor that is accessing the pages most frequently.

The SoC(s) 1104 may include any number of cache(s) 1112, including those described herein. For example, the cache(s) 1112 may include an L3 cache that is available to both the CPU(s) 1106 and the GPU(s) 1108 (e.g., that is connected both the CPU(s) 1106 and the GPU(s) 1108). The cache(s) 1112 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1104 may include an arithmetic logic unit(s) (ALU(s)) which may be leveraged in performing processing with respect to any of the variety of tasks or operations of the vehicle 1100—such as processing DNNs. In addition, the SoC(s) 1104 may include a floating point unit(s) (FPU(s))— or other math coprocessor or numeric coprocessor types— for performing mathematical operations within the system. For example, the SoC(s) 104 may include one or more FPUs integrated as execution units within a CPU(s) 1106 and/or GPU(s) 1108.

The SoC(s) 1104 may include one or more accelerators 1114 (e.g., hardware accelerators, software accelerators, or a combination thereof). For example, the SoC(s) 1104 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1108 and to off-load some of the tasks of the GPU(s) 1108 (e.g., to free up more cycles of the GPU(s) 1108 for performing other tasks). As an example, the accelerator(s) 1114 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1114 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1108, and by using an inference accelerator, for example, a designer may target either the DLA(s) or the GPU(s) 1108 for any function. For example, the designer may focus processing of CNNs and floating point operations on the DLA(s) and leave other functions to the GPU(s) 1108 and/or other accelerator(s) 1114.

The accelerator(s) 1114 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1106. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1114 (e.g., the hardware acceleration cluster) may include a computer vision network on-chip and SRAM, for providing a high-bandwidth, low latency SRAM for the accelerator(s) 1114. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1104 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1114 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence score may be interpreted as a probability, or as providing a relative "weight" of each detection compared to other detections. This confidence score enables the system to make further decisions regarding which detections should be considered as true positive detections rather than false positive detections. For example, the system may set a threshold score for the confidence and consider only the detections exceeding the threshold score as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence score. The neural network may take as its input at least some subset of parameters, such as bounding box dimensions, ground plane estimate obtained (e.g. from another subsystem), inertial measurement unit (IMU) sensor 1166 output that correlates with the vehicle 1100 orientation, distance, 3D location estimates of the object obtained from the neural network and/or other sensors (e.g., LIDAR sensor(s) 1164 or RADAR sensor(s) 1160), among others.

The SoC(s) 1104 may include data store(s) 1116 (e.g., memory). The data store(s) 1116 may be on-chip memory of the SoC(s) 1104, which may store neural networks to be executed on the GPU and/or the DLA. In some examples, the data store(s) 1116 may be large enough in capacity to store multiple instances of neural networks for redundancy and safety. The data store(s) 1112 may comprise L2 or L3 cache(s) 1112. Reference to the data store(s) 1116 may include reference to the memory associated with the PVA, DLA, and/or other accelerator(s) 1114, as described herein.

The SoC(s) 1104 may include one or more processor(s) 1110 (e.g., embedded processors). The processor(s) 1110 may include a boot and power management processor that may be a dedicated processor and subsystem to handle boot power and management functions and related security enforcement. The boot and power management processor may be a part of the SoC(s) 1104 boot sequence and may provide runtime power management services. The boot power and management processor may provide clock and voltage programming, assistance in system low power state transitions, management of SoC(s) 1104 thermals and temperature sensors, and/or management of the SoC(s) 1104 power states. Each temperature sensor may be implemented as a ring-oscillator whose output frequency is proportional to temperature, and the SoC(s) 1104 may use the ring-oscillators to detect temperatures of the CPU(s) 1106, GPU(s) 1108, and/or accelerator(s) 1114. If temperatures are determined to exceed a threshold, the boot and power management processor may enter a temperature fault routine and put the SoC(s) 1104 into a lower power state and/or put the vehicle 1100 into a chauffeur to safe stop mode (e.g., bring the vehicle 1100 to a safe stop).

The processor(s) 1110 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1110 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1110 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1110 may further include a real-time camera engine that may include a dedicated processor subsystem for handling real-time camera management.

The processor(s) 1110 may further include a high-dynamic range signal processor that may include an image signal processor that is a hardware engine that is part of the camera processing pipeline.

The processor(s) 1110 may include a video image compositor that may be a processing block (e.g., implemented on a microprocessor) that implements video post-processing functions needed by a video playback application to produce the final image for the player window. The video image compositor may perform lens distortion correction on wide-view camera(s) 1170, surround camera(s) 1174, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1108 is not required to continuously render new surfaces. Even when the GPU(s) 1108 is powered on and active doing 3D rendering, the video image compositor may be used to offload the GPU(s) 1108 to improve performance and responsiveness.

The SoC(s) 1104 may further include a mobile industry processor interface (MIPI) camera serial interface for receiving video and input from cameras, a high-speed interface, and/or a video input block that may be used for camera and related pixel input functions. The SoC(s) 1104 may further include an input/output controller(s) that may be controlled by software and may be used for receiving I/O signals that are uncommitted to a specific role.

The SoC(s) 1104 may further include a broad range of peripheral interfaces to enable communication with peripherals, audio codecs, power management, and/or other devices. The SoC(s) 1104 may be used to process data from cameras (e.g., connected over Gigabit Multimedia Serial Link and Ethernet), sensors (e.g., LIDAR sensor(s) 1164, RADAR sensor(s) 1160, etc. that may be connected over Ethernet), data from bus 1102 (e.g., speed of vehicle 1100, steering wheel position, etc.), data from GNSS sensor(s) 1158 (e.g., connected over Ethernet or CAN bus). The SoC(s) 1104 may further include dedicated high-performance mass storage controllers that may include their own DMA engines, and that may be used to free the CPU(s) 1106 from routine data management tasks.

The SoC(s) 1104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1104 may be faster, more reliable, and even more energy-efficient and space-efficient than conventional systems. For example, the accelerator(s) 1114, when combined with the CPU(s) 1106, the GPU(s) 1108, and the data store(s) 1116, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1120) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving.

For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1108.

In some examples, a CNN for facial recognition and vehicle owner identification may use data from camera sensors to identify the presence of an authorized driver and/or owner of the vehicle 1100. The always on sensor processing engine may be used to unlock the vehicle when the owner approaches the driver door and turn on the lights, and, in security mode, to disable the vehicle when the owner leaves the vehicle. In this way, the SoC(s) 1104 provide for security against theft and/or carjacking.

In another example, a CNN for emergency vehicle detection and identification may use data from microphones 1196 to detect and identify emergency vehicle sirens. In contrast to conventional systems, that use general classifiers to detect sirens and manually extract features, the SoC(s) 1104 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1158. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1162, until the emergency vehicle(s) passes.

The vehicle may include a CPU(s) 1118 (e.g., discrete CPU(s), or dCPU(s)), that may be coupled to the SoC(s) 1104 via a high-speed interconnect (e.g., PCIe). The CPU(s) 1118 may include an X86 processor, for example. The CPU(s) 1118 may be used to perform any of a variety of functions, including arbitrating potentially inconsistent results between ADAS sensors and the SoC(s) 1104, and/or monitoring the status and health of the controller(s) 1136 and/or infotainment SoC 1130, for example.

The vehicle 1100 may include a GPU(s) 1120 (e.g., discrete GPU(s), or dGPU(s)), that may be coupled to the SoC(s) 1104 via a high-speed interconnect (e.g., NVIDIA's NVLINK). The GPU(s) 1120 may provide additional artificial intelligence functionality, such as by executing redundant and/or different neural networks, and may be used to train and/or update neural networks based on input (e.g., sensor data) from sensors of the vehicle 1100.

The vehicle 1100 may further include the network interface 1124 which may include one or more wireless antennas 1126 (e.g., one or more wireless antennas for different communication protocols, such as a cellular antenna, a Bluetooth antenna, etc.). The network interface 1124 may be used to enable wireless connectivity over the Internet with the cloud (e.g., with the server(s) 1178 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1100 information about vehicles in proximity to the vehicle 1100 (e.g., vehicles in front of, on the side of, and/or behind the vehicle 1100). This functionality may be part of a cooperative adaptive cruise control functionality of the vehicle 1100.

The network interface 1124 may include a SoC that provides modulation and demodulation functionality and enables the controller(s) 1136 to communicate over wireless networks. The network interface 1124 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1100 may further include data store(s) 1128 which may include off-chip (e.g., off the SoC(s) 1104) storage. The data store(s) 1128 may include one or more storage elements including RAM, SRAM, DRAM, VRAM, Flash, hard disks, and/or other components and/or devices that may store at least one bit of data.

The vehicle 1100 may further include GNSS sensor(s) 1158. The GNSS sensor(s) 1158 (e.g., GPS, assisted GPS sensors, differential GPS (DGPS) sensors, etc.), to assist in mapping, perception, occupancy grid generation, and/or path planning functions. Any number of GNSS sensor(s) 1158 may be used, including, for example and without limitation, a GPS using a USB connector with an Ethernet to Serial (RS-232) bridge.

The vehicle 1100 may further include RADAR sensor(s) 1160. The RADAR sensor(s) 1160 may be used by the vehicle 1100 for long-range vehicle detection, even in darkness and/or severe weather conditions. RADAR functional safety levels may be ASIL B. The RADAR sensor(s) 1160 may use the CAN and/or the bus 1102 (e.g., to transmit data generated by the RADAR sensor(s) 1160) for control and to access object tracking data, with access to Ethernet to access raw data in some examples. A wide variety of RADAR sensor types may be used. For example, and without limitation, the RADAR sensor(s) 1160 may be suitable for front, rear, and side RADAR use. In some example, Pulse Doppler RADAR sensor(s) are used.

The RADAR sensor(s) 1160 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1160 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1100 surroundings at higher speeds with minimal interference from traffic in adjacent lanes. The other two antennae may expand the field of view, making it possible to quickly detect vehicles entering or leaving the vehicle's 1100 lane.

Mid-range RADAR systems may include, as an example, a range of up to 1160 m (front) or 80 m (rear), and a field of view of up to 42 degrees (front) or 1150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1100 may further include ultrasonic sensor(s) 1162. The ultrasonic sensor(s) 1162, which may be positioned at the front, back, and/or the sides of the vehicle 1100, may be used for park assist and/or to create and update an occupancy grid. A wide variety of ultrasonic sensor(s) 1162 may be used, and different ultrasonic sensor(s) 1162 may be used for different ranges of detection (e.g., 2.5 m, 4 m). The ultrasonic sensor(s) 1162 may operate at functional safety levels of ASIL B.

The vehicle 1100 may include LIDAR sensor(s) 1164. The LIDAR sensor(s) 1164 may be used for object and pedestrian detection, emergency braking, collision avoidance, and/or other functions. The LIDAR sensor(s) 1164 may be functional safety level ASIL B. In some examples, the vehicle 1100 may include multiple LIDAR sensors 1164 (e.g., two, four, six, etc.) that may use Ethernet (e.g., to provide data to a Gigabit Ethernet switch).

In some examples, the LIDAR sensor(s) 1164 may be capable of providing a list of objects and their distances for a 360-degree field of view. Commercially available LIDAR sensor(s) 1164 may have an advertised range of approximately 1100 m, with an accuracy of 2 cm-3 cm, and with support for a 1100 Mbps Ethernet connection, for example. In some examples, one or more non-protruding LIDAR sensors 1164 may be used. In such examples, the LIDAR sensor(s) 1164 may be implemented as a small device that may be embedded into the front, rear, sides, and/or corners of the vehicle 1100. The LIDAR sensor(s) 1164, in such examples, may provide up to a 120-degree horizontal and 35-degree vertical field-of-view, with a 200 m range even for low-reflectivity objects. Front-mounted LIDAR sensor(s) 1164 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1100. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1164 may be less susceptible to motion blur, vibration, and/or shock.

The vehicle may further include IMU sensor(s) 1166. The IMU sensor(s) 1166 may be located at a center of the rear axle of the vehicle 1100, in some examples. The IMU sensor(s) 1166 may include, for example and without limitation, an accelerometer(s), a magnetometer(s), a gyroscope(s), a magnetic compass(es), and/or other sensor types. In some examples, such as in six-axis applications, the IMU sensor(s) 1166 may include accelerometers and gyroscopes, while in nine-axis applications, the IMU sensor(s) 1166 may include accelerometers, gyroscopes, and magnetometers.

In some embodiments, the IMU sensor(s) 1166 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1166 may enable the vehicle 1100 to estimate heading without requiring input from a magnetic sensor by directly observing and correlating the changes in velocity from GPS to the IMU sensor(s) 1166. In some examples, the IMU sensor(s) 1166 and the GNSS sensor(s) 1158 may be combined in a single integrated unit.

The vehicle may include microphone(s) 1196 placed in and/or around the vehicle 1100. The microphone(s) 1196 may be used for emergency vehicle detection and identification, among other things.

The vehicle may further include any number of camera types, including stereo camera(s) 1168, wide-view camera(s) 1170, infrared camera(s) 1172, surround camera(s) 1174, long-range and/or mid-range camera(s) 1198, and/or other camera types. The cameras may be used to capture image data around an entire periphery of the vehicle 1100. The types of cameras used depends on the embodiments and requirements for the vehicle 1100, and any combination of camera types may be used to provide the necessary coverage around the vehicle 1100. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 11A and FIG. 11B.

The vehicle 1100 may further include vibration sensor(s) 1142. The vibration sensor(s) 1142 may measure vibrations of components of the vehicle, such as the axle(s). For example, changes in vibrations may indicate a change in road surfaces. In another example, when two or more vibration sensors 1142 are used, the differences between the vibrations may be used to determine friction or slippage of the road surface (e.g., when the difference in vibration is between a power-driven axle and a freely rotating axle).

The vehicle 1100 may include an ADAS system 1138. The ADAS system 1138 may include a SoC, in some examples. The ADAS system 1138 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1160, LIDAR sensor(s) 1164, and/or a camera(s). The ACC systems may include longitudinal ACC and/or lateral ACC. Longitudinal ACC monitors and controls the distance to the vehicle immediately ahead of the vehicle 1100 and automatically adjust the vehicle speed to maintain a safe distance from vehicles ahead. Lateral ACC performs distance keeping, and advises the vehicle 1100 to change lanes when necessary. Lateral ACC is related to other ADAS applications such as LCA and CWS.

CACC uses information from other vehicles that may be received via the network interface 1124 and/or the wireless antenna(s) 1126 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1100), while the I2V communication concept provides information about traffic further ahead. CACC systems may include either or both I2V and V2V information sources. Given the information of the vehicles ahead of the vehicle 1100, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1160, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1160, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1100 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1100 if the vehicle 1100 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1160, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1100 is backing up. Some RCTW systems include AEB to ensure that the vehicle brakes are applied to avoid a crash. RCTW systems may use one or more rear-facing RADAR sensor(s) 1160, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1100, the vehicle 1100 itself must, in the case of conflicting results, decide whether to heed the result from a primary computer or a secondary computer (e.g., a first controller 1136 or a second controller 1136). For example, in some embodiments, the ADAS system 1138 may be a backup and/or secondary computer for providing perception information to a backup computer rationality module. The backup computer rationality monitor may run a redundant diverse software on hardware components to detect faults in perception and dynamic driving tasks. Outputs from the ADAS system 1138 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1104.

In other examples, ADAS system 1138 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1138 may be fed into the primary computer's perception block and/or the primary computer's dynamic driving task block. For example, if the ADAS system 1138 indicates a forward crash warning due to an object immediately ahead, the perception block may use this information when identifying objects. In other examples, the secondary computer may have its own neural network which is trained and thus reduces the risk of false positives, as described herein.

The vehicle 1100 may further include the infotainment SoC 1130 (e.g., an in-vehicle infotainment system (IVI)). Although illustrated and described as a SoC, the infotainment system may not be a SoC, and may include two or more discrete components. The infotainment SoC 1130 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1100. For example, the infotainment SoC 1130 may radios, disk players, navigation systems, video players, USB and Bluetooth connectivity, carputers, in-car entertainment, Wi-Fi, steering wheel audio controls, hands free voice control, a heads-up display (HUD), an HMI display 1134, a telematics device, a control panel (e.g., for controlling and/or interacting with various components, features, and/or systems), and/or other components. The infotainment SoC 1130 may further be used to provide information (e.g., visual and/or audible) to a user(s) of the vehicle, such as information from the ADAS system 1138, autonomous driving information such as planned vehicle maneuvers, trajectories, surrounding environment information (e.g., intersection information, vehicle information, road information, etc.), and/or other information.

The infotainment SoC 1130 may include GPU functionality. The infotainment SoC 1130 may communicate over the bus 1102 (e.g., CAN bus, Ethernet, etc.) with other devices, systems, and/or components of the vehicle 1100. In some examples, the infotainment SoC 1130 may be coupled to a supervisory MCU such that the GPU of the infotainment system may perform some self-driving functions in the event that the primary controller(s) 1136 (e.g., the primary and/or backup computers of the vehicle 1100) fail. In such an example, the infotainment SoC 1130 may put the vehicle 1100 into a chauffeur to safe stop mode, as described herein.

The vehicle 1100 may further include an instrument cluster 1132 (e.g., a digital dash, an electronic instrument cluster, a digital instrument panel, etc.). The instrument cluster 1132 may include a controller and/or supercomputer (e.g., a discrete controller or supercomputer). The instrument cluster 1132 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1130 and the instrument cluster 1132. In other words, the instrument cluster 1132 may be included as part of the infotainment SoC 1130, or vice versa.

Figure 11D:
FIG. 11D is a system diagram for communication between cloud-based server(s) and the example autonomous vehicle of FIG. 11A, in accordance with some embodiments of the present disclosure.

FIG. 11D is a system diagram for communication between cloud-based server(s) and the example autonomous vehicle 1100 of FIG. 11A, in accordance with some embodiments of the present disclosure. The system 1176 may include server(s) 1178, network(s) 1190, and vehicles, including the vehicle 1100. The server(s) 1178 may include a plurality of GPUs 1184(A)-1184(H) (collectively referred to herein as GPUs 1184), PCIe switches 1182(A)-1182(H) (collectively referred to herein as PCIe switches 1182), and/or CPUs 1180(A)-1180(B) (collectively referred to herein as CPUs 1180). The GPUs 1184, the CPUs 1180, and the PCIe switches may be interconnected with high-speed interconnects such as, for example and without limitation, NVLink interfaces 1188 developed by NVIDIA and/or PCIe connections 1186. In some examples, the GPUs 1184 are connected via NVLink and/or NVSwitch SoC and the GPUs 1184 and the PCIe switches 1182 are connected via PCIe interconnects. Although eight GPUs 1184, two CPUs 1180, and two PCIe switches are illustrated, this is not intended to be limiting. Depending on the embodiment, each of the server(s) 1178 may include any number of GPUs 1184, CPUs 1180, and/or PCIe switches. For example, the server(s) 1178 may each include eight, sixteen, thirty-two, and/or more GPUs 1184.

The server(s) 1178 may receive, over the network(s) 1190 and from the vehicles, image data representative of images showing unexpected or changed road conditions, such as recently commenced road-work. The server(s) 1178 may transmit, over the network(s) 1190 and to the vehicles, neural networks 1192, updated neural networks 1192, and/or map information 1194, including information regarding traffic and road conditions. The updates to the map information 1194 may include updates for the HD map 1122, such as information regarding construction sites, potholes, detours, flooding, and/or other obstructions. In some examples, the neural networks 1192, the updated neural networks 1192, and/or the map information 1194 may have resulted from new training and/or experiences represented in data received from any number of vehicles in the environment, and/or based on training performed at a datacenter (e.g., using the server(s) 1178 and/or other servers).

The server(s) 1178 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1190, and/or the machine learning models may be used by the server(s) 1178 to remotely monitor the vehicles.

In some examples, the server(s) 1178 may receive data from the vehicles and apply the data to up-to-date real-time neural networks for real-time intelligent inferencing. The server(s) 1178 may include deep-learning supercomputers and/or dedicated AI computers powered by GPU(s) 1184, such as a DGX and DGX Station machines developed by NVIDIA. However, in some examples, the server(s) 1178 may include deep learning infrastructure that use only CPU-powered datacenters.

The deep-learning infrastructure of the server(s) 1178 may be capable of fast, real-time inferencing, and may use that capability to evaluate and verify the health of the processors, software, and/or associated hardware in the vehicle 1100. For example, the deep-learning infrastructure may receive periodic updates from the vehicle 1100, such as a sequence of images and/or objects that the vehicle 1100 has located in that sequence of images (e.g., via computer vision and/or other machine learning object classification techniques). The deep-learning infrastructure may run its own neural network to identify the objects and compare them with the objects identified by the vehicle 1100 and, if the results do not match and the infrastructure concludes that the AI in the vehicle 1100 is malfunctioning, the server(s) 1178 may transmit a signal to the vehicle 1100 instructing a fail-safe computer of the vehicle 1100 to assume control, notify the passengers, and complete a safe parking maneuver.

For inferencing, the server(s) 1178 may include the GPU(s) 1184 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 12:
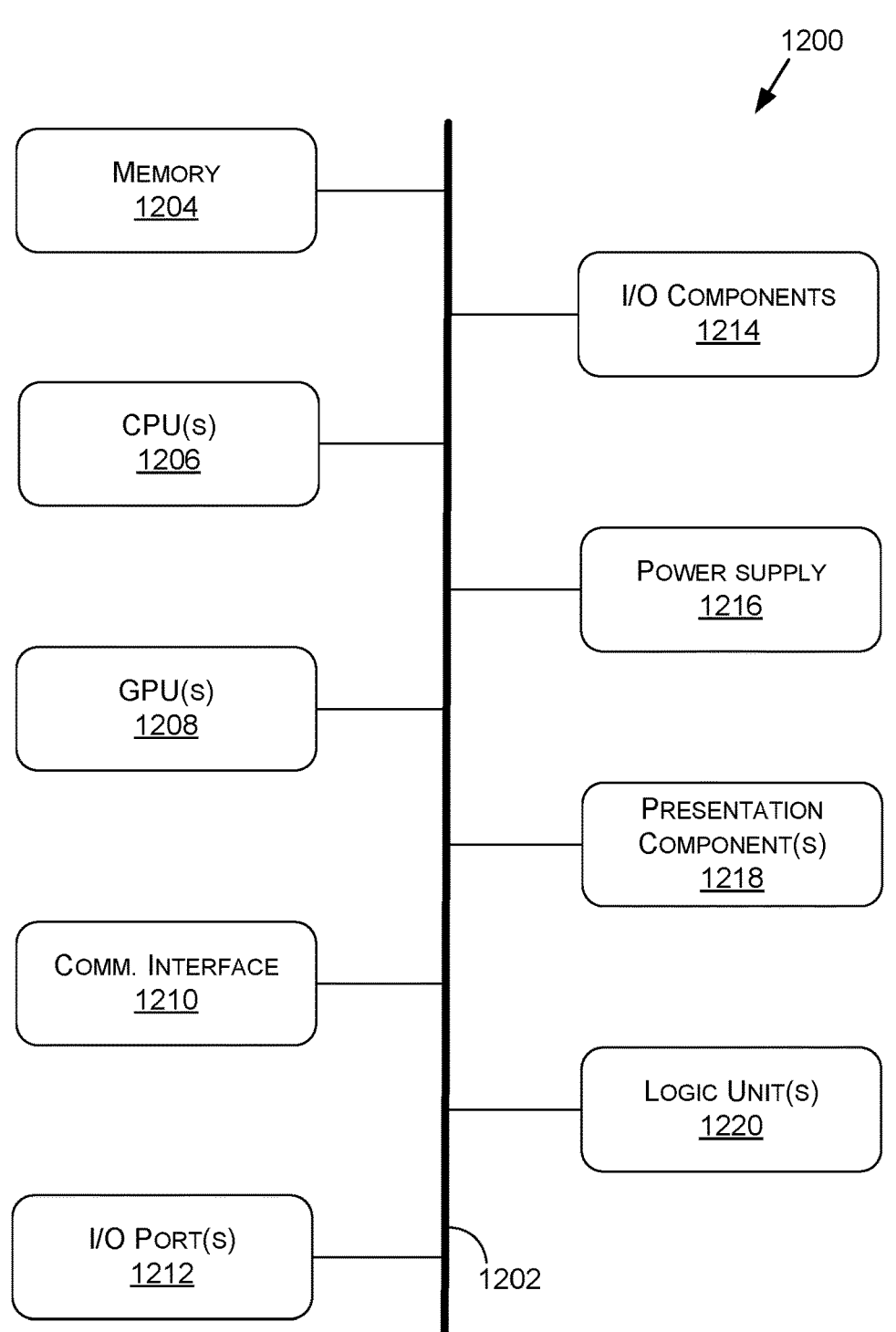
FIG. 12 is a block diagram of an example computing device suitable for use in implementing some embodiments of the present disclosure.

FIG. 12 is a block diagram of an example computing device(s) 1200 suitable for use in implementing some embodiments of the present disclosure. Computing device 1200 may include an interconnect system 1202 that directly or indirectly couples the following devices: memory 1204, one or more central processing units (CPUs) 1206, one or more graphics processing units (GPUs) 1208, a communication interface 1210, input/output (I/O) ports 1212, input/ output components 1214, a power supply 1216, one or more presentation components 1218 (e.g., display(s)), and one or more logic units 1220. In at least one embodiment, the computing device(s) 1200 may comprise one or more virtual machines (VMs), and/or any of the components thereof may comprise virtual components (e.g., virtual hardware components). For non-limiting examples, one or more of the GPUs 1208 may comprise one or more vGPUs, one or more of the CPUs 1206 may comprise one or more vCPUs, and/or one or more of the logic units 1220 may comprise one or more virtual logic units. As such, a computing device(s) 1200 may include discrete components (e.g., a full GPU dedicated to the computing device 1200), virtual components (e.g., a portion of a GPU dedicated to the computing device 1200), or a combination thereof.

Although the various blocks of FIG. 12 are shown as connected via the interconnect system 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). In other words, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 12.

The interconnect system 1202 may represent one or more links or busses, such as an address bus, a data bus, a control bus, or a combination thereof. The interconnect system 1202 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1206 may be directly connected to the memory 1204. Further, the CPU 1206 may be directly connected to the GPU 1208. Where there is direct, or point-to-point connection between components, the interconnect system 1202 may include a PCIe link to carry out the connection. In these examples, a PCI bus need not be included in the computing device 1200.

The memory 1204 may include any of a variety of computer-readable media. The computer-readable media may be any available media that may be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1200. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute at least some of the computer-readable instructions to control one or more components of the computing device 1200 to perform one or more of the methods and/or processes described herein. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an Advanced RISC Machines (ARM) processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

In addition to or alternatively from the CPU(s) 1206, the GPU(s) 1208 may be configured to execute at least some of the computer-readable instructions to control one or more components of the computing device 1200 to perform one or more of the methods and/or processes described herein. One or more of the GPU(s) 1208 may be an integrated GPU (e.g., with one or more of the CPU(s) 1206 and/or one or more of the GPU(s) 1208 may be a discrete GPU. In embodiments, one or more of the GPU(s) 1208 may be a coprocessor of one or more of the CPU(s) 1206. The GPU(s) 1208 may be used by the computing device 1200 to render graphics (e.g., 3D graphics) or perform general purpose computations. For example, the GPU(s) 1208 may be used for General-Purpose computing on GPUs (GPGPU). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data or any other suitable data, such as GPGPU data. The display memory may be included as part of the memory 1204. The GPU(s) 1208 may include two or more GPUs operating in parallel (e.g., via a link). The link may directly connect the GPUs (e.g., using NVLINK) or may connect the GPUs through a switch (e.g., using NVSwitch). When combined together, each GPU 1208 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1206 and/or the GPU(s) 1208, the logic unit(s) 1220 may be configured to execute at least some of the computer-readable instructions to control one or more components of the computing device 1200 to perform one or more of the methods and/or processes described herein. In embodiments, the CPU(s) 1206, the GPU(s) 1208, and/or the logic unit(s) 1220 may discretely or jointly perform any combination of the methods, processes and/or portions thereof. One or more of the logic units 1220 may be part of and/or integrated in one or more of the CPU(s) 1206 and/or the GPU(s) 1208 and/or one or more of the logic units 1220 may be discrete components or otherwise external to the CPU(s) 1206 and/or the GPU(s) 1208. In embodiments, one or more of the logic units 1220 may be a coprocessor of one or more of the CPU(s) 1206 and/or one or more of the GPU(s) 1208.

Examples of the logic unit(s) 1220 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1210 may include one or more receivers, transmitters, and/or transceivers that enable the computing device 1200 to communicate with other computing devices via an electronic communication network, included wired and/or wireless communications. The communication interface 1210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1220 and/or communication interface 1210 may include one or more data processing units (DPUs) to transmit data received over a network and/or through interconnect system 1202 directly to (e.g., a memory of) one or more GPU(s) 1208.

The I/O ports 1212 may enable the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that enable detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to enable the components of the computing device 1200 to operate.

The presentation component(s) 1218 may include a display (e.g., a monitor, a touch screen, a television screen, a heads-up-display (HUD), other display types, or a combination thereof), speakers, and/or other presentation components. The presentation component(s) 1218 may receive data from other components (e.g., the GPU(s) 1208, the CPU(s) 1206, DPUs, etc.), and output the data (e.g., as an image, video, sound, etc.).

Example Data Center

Figure 13:
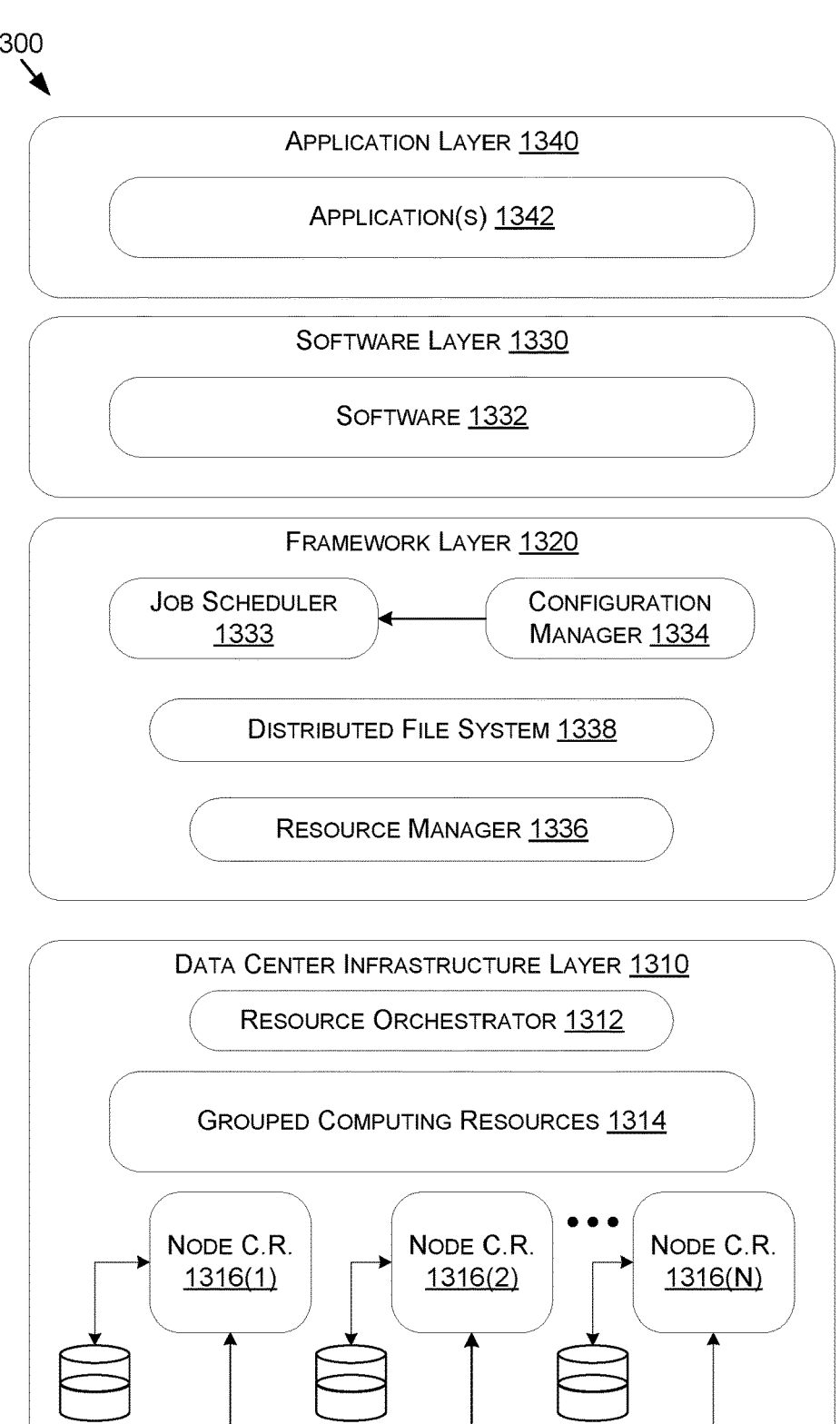
FIG. 13 is a block diagram of an example data center suitable for use in implementing some embodiments of the present disclosure.

FIG. 13 illustrates an example data center 1300 that may be used in at least one embodiments of the present disclosure. The data center 1300 may include a data center infrastructure layer 1310, a framework layer 1320, a software layer 1330, and/or an application layer 1340.

As shown in FIG. 13, the data center infrastructure layer 1310 may include a resource orchestrator 1312, grouped computing resources 1314, and node computing resources ("node C.R.s") 1316(1)-1316(N), where "N" represents any whole, positive integer. In at least one embodiment, node C.R.s 1316(1)-1316(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1316(1)-1316(N) may correspond to a server having one or more of the above-mentioned computing resources. In addition, in some embodiments, the node C.R.s 1316(1)-13161(N) may include one or more virtual components, such as vGPUs, vCPUs, and/or the like, and/or one or more of the node C.R.s 1316(1)-1316(N) may correspond to a virtual machine (VM).

In at least one embodiment, grouped computing resources 1314 may include separate groupings of node C.R.s 1316 housed within one or more racks (not shown), or many racks housed in data centers at various geographical locations (also not shown). Separate groupings of node C.R.s 1316 within grouped computing resources 1314 may include grouped compute, network, memory or storage resources that may be configured or allocated to support one or more workloads. In at least one embodiment, several node C.R.s 1316 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1312 may configure or otherwise control one or more node C.R.s 1316(1)-1316(N) and/or grouped computing resources 1314. In at least one embodiment, resource orchestrator 1312 may include a software design infrastructure (SDI) management entity for the data center 1300. The resource orchestrator 1312 may include hardware, software, or some combination thereof.

In at least one embodiment, as shown in FIG. 13, framework layer 1320 may include a job scheduler 1333, a configuration manager 1334, a resource manager 1336, and/or a distributed file system 1338. The framework layer 1320 may include a framework to support software 1332 of software layer 1330 and/or one or more application(s) 1342 of application layer 1340. The software 1332 or application(s) 1342 may respectively include web-based service software or applications, such as those provided by Amazon Web Services, Google Cloud and Microsoft Azure. The framework layer 1320 may be, but is not limited to, a type of free and open-source software web application framework such as Apache Spark™ (hereinafter "Spark") that may utilize distributed file system 1338 for large-scale data processing (e.g., "big data"). In at least one embodiment, job scheduler 1333 may include a Spark driver to facilitate scheduling of workloads supported by various layers of data center 1300. The configuration manager 1334 may be capable of configuring different layers such as software layer 1330 and framework layer 1320 including Spark and distributed file system 1338 for supporting large-scale data processing. The resource manager 1336 may be capable of managing clustered or grouped computing resources mapped to or allocated for support of distributed file system 1338 and job scheduler 1333. In at least one embodiment, clustered or grouped computing resources may include grouped computing resource 1314 at data center infrastructure layer 1310. The resource manager 1336 may coordinate with resource orchestrator 1312 to manage these mapped or allocated computing resources.

In at least one embodiment, software 1332 included in software layer 1330 may include software used by at least portions of node C.R.s 1316(1)-1316(N), grouped computing resources 1314, and/or distributed file system 1338 of framework layer 1320. One or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316(1)-1316(N), grouped computing resources 1314, and/or distributed file system 1338 of framework layer 1320. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1334, resource manager 1336, and resource orchestrator 1312 may implement any number and type of self-modifying actions based on any amount and type of data acquired in any technically feasible fashion. Self-modifying actions may relieve a data center operator of data center 1300 from making possibly bad configuration decisions and possibly avoiding underutilized and/or poor performing portions of a data center.

The data center 1300 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1300. In at least one embodiment, trained or deployed machine learning models corresponding to one or more neural networks may be used to infer or predict information using resources described above with respect to the data center 1300 by using weight parameters calculated through one or more training techniques, such as but not limited to those described herein.

In at least one embodiment, the data center 1300 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1200 of FIG. 12—e.g., each device may include similar components, features, and/or functionality of the computing device(s) 1200. In addition, where backend devices (e.g., servers, NAS, etc.) are implemented, the backend devices may be included as part of a data center 1300, an example of which is described in more detail herein with respect to FIG. 13.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1200 described herein with respect to FIG. 12. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

determining, using one or more first neural networks and based at least on a set of images, a first subset of images by at least removing one or more first images from the set of images that are associated with one or more first object classifications;

determining, using one or more second neural networks and based at least on the set of images, a second subset of images by at least identifying one or more images from the set of images that are associated with one or more second object classifications;

determining, using one or more third neural networks and based at least on a third subset of images that includes the first subset of images and the second subset of images, one or more third object classifications associated with the third subset of images; and performing one or more operations associated with training one or more fourth neural networks based at least on the one or more third object classifications.

2. The method of claim 1, wherein:

the one or more first neural networks are trained to detect the one or more first object classifications; or the one or more second neural networks are trained to detect the one or more second object classifications.

3. The method of claim 1, further comprising generating the third subset of images by combining the first subset of images with the second subset of images.

4. The method of claim 1, further comprising:

determining, based at least on input data, a probability threshold associated with the one or more first neural networks, wherein the determining the first subset of images is further based at least on the probability threshold.

5. The method of claim 1, further comprising:

determining at least a first uncertainty classification associated with a first image of the third subset of images, the first uncertainty classification indicating additional review is required for a first object classification of the one or more third object classifications that is associated with the first image; and determining at least a second uncertainty classification associated with a second image of the third subset of images, the second uncertainty classification indicating additional review is not required of a second object classification of the one or more third object classifications that is associated with the second image.

6. The method of claim 1, further comprising:

determining, using one or more second fourth neural networks and based at least on the third subset of images, one or more probabilities associated with at least an image of the third subset of images;

determining an uncertainty score based at least on a distribution of the one or more probabilities; and determining, based at least on the uncertainty score, an uncertainty classification to associate with the image.

7. The method of claim 6, wherein the determining the one or more probabilities associated with the image of the third subset of images comprises:

determining, using at least one neural network of the one or more fourth neural networks, a first probability associated with the image;

determining, using the at least one neural network, a second probability associated with the image; and determining the one or more probabilities is to include at least the first probability and the second probability.

8. The method of claim 6, wherein the determining the one or more probabilities associated with the image of the third subset of images comprises:

determining, using a first neural network of the one or more fourth neural networks, a first probability associated with the image;

determining, using a second neural network of the one or more fourth neural networks, a second probability associated with the image; and determining the one or more probabilities is to include at least the first probability and the second probability.

9. A system comprising:

one or more processors to:

determine, using one or more first neural networks and based at least on image data representative of a set of images, one or more first probabilities associated with at least a first image of the set of images and one or more second probabilities associated with at least a second image of the set of images;

determine, based at least on the one or more first probabilities, a first uncertainty classification associated with the first image, the first uncertainty classification indicating to perform a first review of a first object classification associated with the first image;

determine, based at least on the one or more second probabilities, a second uncertainty classification associated with the second image, the second uncertainty classification associated with refraining from performing a second review a second object classification associated with the second image; and determine, using one or more second neural networks and based at least on the image data, at least the first object classification associated with the first image and the second object classification associated with the second image.

10. The system of claim 9, wherein the determination of the one or more first probabilities associated with the first image comprises:

determining, using a neural network of the one or more first neural networks and based at least on the image data, a first probability of the one or more first probabilities associated with the first image; and determining, using the neural network and based at least on the image data, a second probability of the one or more first probabilities associated with the first image.

11. The system of claim 9, wherein the determination of the one or more first probabilities associated with the first image comprises:

determining, using a first neural network of the one or more first neural networks and based at least on the image data, a first probability of the one or more first probabilities associated with the first image; and determining, using a second neural network of the one or more first neural networks and based at least on the image data, a second probability of the one or more first probabilities associated with the first image.

12. The system of claim 9, wherein the one or more processors are further to determine, using one or more third neural networks and based at least on second image data representative of a second set of images, the set of images by removing one or more images of the second set of images that are associated with a third object classification.

13. The system of claim 12, wherein the one or more processors are further to:

determine, based at least on input data, a probability threshold associated with the one or more third neural networks, wherein the set of images is further determined based at least on the probability threshold.

14. The system of claim 9, wherein the one or more processors are further to determine, using one or more third neural networks and based at least on second image data representative of a second set of images, the set of images by identifying one or more images of the second set of images that are associated with at least one of the first object classification or the second object classification.

15. The system of claim 14, wherein the one or more processors are further to:

determine, based at least on input data, a probability threshold associated with the one or more third neural networks, wherein the set of images is further determined based at least on the probability threshold.

16. The system of claim 9, wherein the one or more processors are further to:

determine, using one or more third neural networks and based at least on second image data representative of a second set of images, a third set of images by removing one or more first images of the second set of images that are associated with third object classification;

determine, using one or more fourth neural networks and based at least on the second image data, a third set of images by identifying one or more second images of the second set of images that are associated with at least one of the first object classification or the second object classification; and generate the set of images to include the second set of images and the third set of images.

17. The system of claim 9, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

18. One or more processors comprising processing circuitry to:

determine, using one or more first neural networks and based at least on a set of images, a first subset of images by at least removing one or more first images from the set of images that are associated with one or more first object classifications;

determine, using one or more second neural networks and based at least on the set of images, a second subset of images by at least identifying one or more images from the set of images that are associated with one or more second object classifications;

determine, using one or more third neural networks and based at least on a third subset of images that includes the first subset of images and the second subset of images, one or more third object classifications associated with the third subset of images; and perform one or more operations based at least on the one or more third object classifications.

19. The one or more processors of claim 18, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

20. The one or more processors of claim 18, wherein the one or more third object classifications include at least the one or more second object classifications.

* * * * *